(12) United States Patent
Limberg

(10) Patent No.: US 6,400,393 B1
(45) Date of Patent: Jun. 4, 2002

(54) DTV RECEIVER WITH FILTER IN I-F CIRCUITRY TO SUPPRESS FM SOUND CARRIER OF NTSC CO-CHANNEL INTERFERING SIGNAL

(75) Inventor: Allen LeRoy Limberg, Fairfax County, VA (US)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/826,790

(22) Filed: Mar. 24, 1997

Related U.S. Application Data

(60) Provisional application No. 60/031,358, filed on Nov. 20, 1996.

(51) Int. Cl.[7] .............................. H04N 5/38; H04N 5/21; H04N 5/213; H04N 5/217
(52) U.S. Cl. ........................... 348/21; 348/21; 348/606; 348/607; 348/611
(58) Field of Search .......................... 348/21, 606, 607, 348/611, 614, 618, 619, 622; 455/63, 67.3, 114; 342/21, 616, 607, 611, 614, 618, 619, 622; H04N 5/38, 5/21, 5/213, 5/217

(56) References Cited

U.S. PATENT DOCUMENTS 4,646,135 A * 2/1987 Eichelberger et al. ........ 348/21
5,087,975 A * 2/1992 Citta et al. .................... 348/614
5,389,977 A * 2/1995 Lee .............................. 348/614
5,479,449 A * 12/1995 Patel et al. .................... 348/21
5,483,292 A * 1/1996 Ko ............................... 348/614
5,577,270 A * 11/1996 Sakai ....................... 455/180.1
5,623,320 A * 4/1997 Rim ............................. 348/614
5,745,187 A * 4/1998 Hulyalkar et al. ........... 348/611

* cited by examiner

*Primary Examiner*—Nathan Flynn
*Assistant Examiner*—Vivek Srivastava
(74) *Attorney, Agent, or Firm*—Robert E. Bushnell, Esq.

(57) ABSTRACT

The frequency-modulated sound carrier of any co-channel interfering NTSC television signal that accompanies multiple-level symbols in a digital receiver, such as a digital television receiver, is suppressed using a surface-acoustic-wave (SAW) filter in the intermediate-frequency (I-F) amplifier circuitry. This reduces data-slicing errors during symbol decoding and improves bit error rate (BER) during subsequent trellis decoding. When a comb filter is used before data slicing to reduce the energy of co-channel interfering NTSC television signal, the SAW filter in the I-F amplifier circuitry eases the filtering requirements on the comb filter such that only video components of co-channel interfering NTSC television signal need be suppressed.

19 Claims, 6 Drawing Sheets

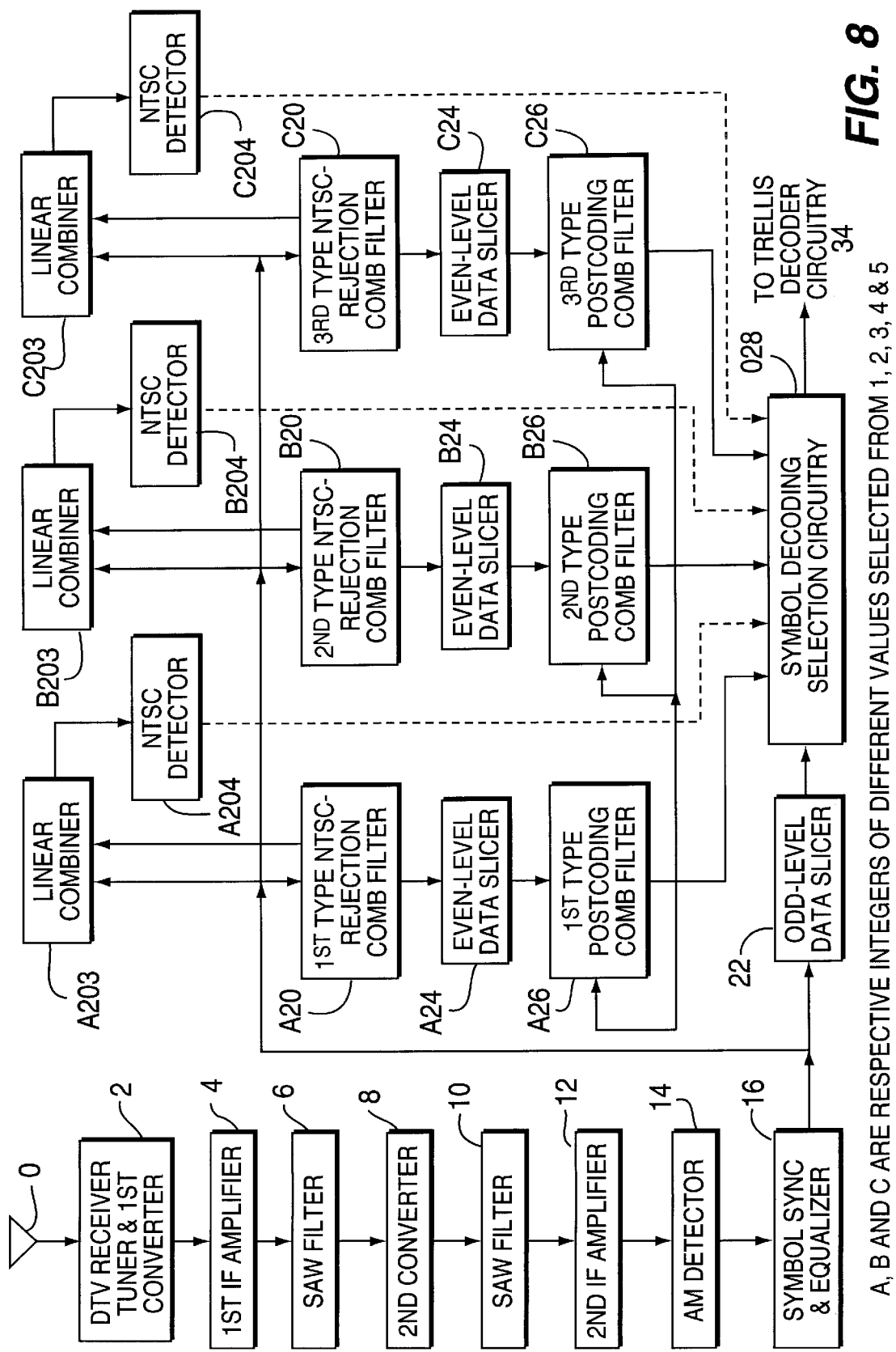

DTV RECEIVER WITH FILTER IN I-F CIRCUITRY TO SUPPRESS FM SOUND CARRIER OF NTSC CO-CHANNEL INTERFERING SIGNAL

This application is filed under 35 U.S.C. 111(a) claiming pursuant to 35 U.S.C. 119(e)(1) benefit of the filing data of provisional application Ser. No. 60/031,358 filed Nov. 20, 1996, pursuant to 35 U.S.C. 111(b).

The present invention relates to digital television systems, such as the digital high-definition television (HDTV) system used for terrestrial broadcasting in the United States of America in accordance with the Advanced Television Sub-Committee (ATSC) standard, and more particularly, to digital television (DTV) signal receivers with filter circuitry for suppressing co-channel interference from analog television signals, such as those conforming to the National Television Systems Committee (NTSC) standard.

BACKGROUND OF THE INVENTION

Digital television (DTV) signal radio receivers convert digital television signals to baseband symbols and perform symbol decoding using data-slicing procedures. DTV signal radio receivers are found in complete digital television sets provided with viewing screens, and the inventor envisions that DTV signal radio receivers will be found in digital tape recorders. In digital tape recorders it is desirable to remove co-channel interfering analog TV signal before tape recording, so that the time-base stability in the co-channel interfering analog TV signal is good enough that comb filtering can be employed that involves differential delay of DTV signals that extends over several horizontal scan lines. Symbol decoding is done after The comb filtering to suppress co-channel interfering analog TV signal is followed by symbol decoding, so that the recoding effects of the comb filtering can be compensated for during the symbol decoding procedures. The decoded data can then be recoded in accordance with a symbol coding suitable to digital tape recording. The symbol coding can, for example, comprise interleaved non-return to-zero, invert-on-ONEs (I-NRZI) modulation.

A Digital Television Standard published Sep. 16, 1995 by the Advanced Television Subcommittee (ATSC) specifies vestigial sideband (VSB) signals for transmitting digital television (DTV) signals in 6-MHz-bandwidth television channels such as those currently used in over-the-air broadcasting of National Television Subcommittee (NTSC) analog television signals within the United States. The VSB DTV signal is designed so its spectrum is likely to interleave with the spectrum of a co-channel interfering NTSC analog TV signal. This is done by positioning the pilot carrier and the principal amplitude-modulation sideband frequencies of the DTV signal at odd multiples of one-quarter the horizontal scan line rate of the NTSC analog TV signal that fall between the even multiples of one-quarter the horizontal scan line rate of the NTSC analog TV signal, at which even multiples most of the energy of the luminance and chrominance components of a co-channel interfering NTSC analog TV signal will fall. The video carrier of an NTSC analog TV signal is offset 1.25 MHz from the lower limit frequency of the television channel. The carrier of the DTV signal is offset from such video carrier by 59.75 times the horizontal scan line rate of the NTSC analog TV signal, to place the carrier of the DTV signal about 309,877.6 kHz from the lower limit frequency of the television channel. Accordingly, the carrier of the DTV signal is about 2,690122.4 Hz from the middle frequency of the television channel.

The exact symbol rate in the Digital Television Standard is (684/286) times the 4.5 MHz sound carrier offset from video carrier in an NTSC analog TV signal: The number of data symbols per horizontal scan line period of an NTSC analog TV signal is 684, since 286 is the factor by which horizontal scan line rate in an NTSC analog TV signal is multiplied to obtain the 4.5 MHz sound carrier offset from video carrier in an NTSC analog TV signal. The symbol rate is 10.762238 megasymbols per second, which can be contained in a VSB signal extending 5.381119 MHz from DTV signal carrier. That is, the VSB signal can be limited to a band extending 5.690997 MHz from the lower limit frequency of the television channel.

The ATSC standard for digital HDTV signal terrestrial broadcasting in the United States of America is capable of transmitting either of two high-definition television (HDTV) formats with 16:9 aspect ratio. One HDTV display format uses 1920 samples per scan line and 1080 active horizontal scan lines per 30 Hz frame with 2:1 field interlace. The other HDTV display format uses 1280 luminance samples per scan line and 720 progressively scanned scan lines of television image per 60 Hz frame. The ATSC standard also accommodates the transmission of DTV display formats other than HDTV display formats, such as the parallel transmission of four television signals having normal definition in comparison to an NTSC analog television signal.

DTV transmitted by vestigial-sideband (VSB) amplitude modulation (AM) during terrestrial broadcasting in the United States of America comprises a succession of consecutive-in-time data fields each containing 313 consecutive-in-time data segments. The data fields may be considered to be consecutively numbered modulo-2, with each odd-numbered data field and the succeeding even-numbered data field forming a data frame. The frame rate is 20.66 frames per second. Each data segment is of 77.3 microseconds duration. So, with the symbol rate being 10.76 MHz there are 832 symbols per data segment. Each segment of data begins with a line synchronization code group of four symbols having successive values of +S, −S, −S and +S. The value +S is one level below the maximum positive data excursion, and the value −S is one level above the maximum negative data excursion. The initial line of each data field includes a field synchronization code group that codes a training signal for channel-equalization and multipath suppression procedures. The training signal is a 511-sample pseudo-noise sequence (or "PN-sequence") followed by three 63-sample PN sequences. The middle ones of the 63-sample PN sequences in the field synchronization codes are transmitted in accordance with a first logic convention in the first line of each odd-numbered data field and in accordance with a second logic convention in the first line of each even-numbered data field, the first and second logic conventions being one's complementary respective to each other.

The data within data lines are trellis coded using twelve interleaved trellis codes, each a ⅔ rate trellis code with one uncoded bit. Prior to being trellis coded, the data are subjected to Reed-Solomon forward error-correction coding, which provides for correction of burst errors arising from noise sources such as a nearby unshielded automobile ignition system. The trellis coding coding results are transmitted as 8-level (3 bits/symbol) one-dimensional-constellation symbol coding for over-the-air transmission, which transmissions are made without symbol preceding separate from the trellis coding procedure. The trellis coding coding results are transmitted as 16-level (4 bits/symbol) one-dimensional-constellation symbol coding for cablecast, which transmissions are made without preceding. The VSB signals have their natural carrier wave, which would vary in amplitude depending on the percentage of modulation, suppressed.

The natural carrier wave is replaced by a pilot carrier wave of fixed amplitude, which amplitude corresponds to a prescribed percentage of modulation. This pilot carrier wave of fixed amplitude is generated by introducing a direct component shift into the modulating voltage applied to the balanced modulator generating the amplitude-modulation sidebands that are supplied to the filter supplying the VSB signal as its response. If the eight levels of 4-bit symbol coding have normalized values of −7, −5, −3, −1, +1, +3, +5 and +7 in the carrier modulating signal, the pilot carrier has a normalized vale of 1.25. The normalized value of +S is +5, and the normalized value of −S is −5.

The current ATSC DTV standard presumes that the suppression of co-channel interfering analog TV signal will be carried out by the DTV signal receiver in the trellis decoding process, after the data-slicing procedures associated with symbol decoding. However, co-channel interfering analog TV signal undesirably introduces errors into the data-slicing processes, which places more burden on the error-correction decoding procedures, trellis decoding and Reed-Solomon decoding. These errors reduce the distance the DTV signal receiver can be from the DTV transmitter and still be assured satisfactory reception. So, providing for the suppression of co-channel interfering analog TV signal by introducing comb filtering before data-slicing is desirable, particularly for suppressing video content in the analog TV signal, if the DTV signal receiver is to be remote from the DTV transmitter. The current ATSC DTV standard does not provide for preceding of all data at the DTV transmitter, so as to compensate for the use of comb filtering before data-slicing within the DTV receiver.

Insofar as the co-channel interference from analog television signals is concerned, it enters the system channel after the DTV transmitter and before the DTV receiver. The use or non-use of symbol preceding at the DTV transmitter has no effect on the co-channel interference from analog television signals. At the DTV receiver, so long as the co-channel interference is not so large as to overload the receiver front-end and capture the system channel, it is advantageous to precede the data slicing circuitry with a comb filter for reducing the energy of higher-energy spectral components of the co-channel interference, thus to reduce the errors occurring during data slicing. The DTV broadcaster should adjust his carrier frequency, which is nominally 310 KHz above the lower limit frequency of the television channel assignment, so that his carrier frequency is optimally offset in frequency from the video carrier of a co-channel NTSC analog TV signal that is likely to interfere. This optimal offset in carrier frequency is exactly 59.75 times the horizontal scan line frequency $f_H$ of the NTSC analog TV signal. The artifacts of the co-channel interference in the demodulated DTV signal will then include beats at 59.75 times the horizontal scan line frequency $f_H$ of the NTSC analog TV signal, generated by heterodyne between the digital HDTV carrier and the video carrier of the co-channel interfering analog TV signal, and beats at 287.25 times $f_H$, generated by heterodyne between the digital HDTV carrier and the chrominance subcarrier of the co-channel interfering analog TV signal, which beats are quite close in frequency to the fifth harmonic of the beats at 59.75 times $f_H$. The artifacts will further include beats at approximately 345.75 times $f_H$, generated by heterodyne between the digital HDTV carrier and the sound carrier of the co-channel interfering analog TV signal, which beats are quite close in frequency to the sixth harmonic of the beats at 59.75 times $f_H$. The nearly harmonic relationship of these beats allows all these carrier frequencies to be suppressed using a single properly designed comb filter incorporating only a few symbol epochs of differential delay.

The inventor in U.S. Pat. No. 5,748,226 issued May 5, 1998 from application Ser. No. 08/746,520 filed Nov. 12 1996, entitled DIGITAL TELEVISION RECEIVER WITH ADAPTIVE FILTER CIRCUITRY FOR SUPPRESSING NTSC CO-CHANNEL INTERFERENCE and incorporated herein by reference describes how the modification of symbol coding that occurs when such comb filtering is used in the DTV signal receiver can be compensated for by postcoding that follows symbol decoding in the DTV receiver, rather than by preceding at the DTV transmitter. Data-slicing is a quantizing process that is not destructive of the symbols resulting from the comb filtering to suppress co-channel interfering analog TV signal, insofar as the transmission of data is concerned, since the data quantization levels are designed to match the symbol levels. The quantization discriminates against the co-channel interfering analog TV signal remnants that remain after the comb filtering and that are appreciably smaller than steps between symbol code levels, however. This is a species of the capture phenomenon in which phenomenon a stronger signal gains at the expense of a weaker one in a quantizing process. Insofar as the transmission of data is concerned, the digital data symbol stream flows through the full length of the system channel. When generalized symbol preceding of all data is done at the DTV transmitter, the additive combination of the differentially delayed data symbol streams is done on a modular basis that does not boost transmitter power or increase average intersymbol distance to help further in overcoming jamming analog TV signal. Instead, the principal mechanism for overcoming jamming analog TV signal is its attenuation vis-a-vis DTV signal, as provided by the comb filtering at the DTV receiver, causing the remnant analog TV signal in the comb filter response to be suppressed by the quantizing effects in the data slicer that immediately follows the comb filter. The order of performing the types of symbol re-coding associated normally with generalized symbol preceding of all data at the DTV transmitter and with comb filtering at the DTV receiver and has no appreciable affect on signal transmission through the system channel under such circumstances, since neither coding scheme destroys signal transmission capability for the symbol stream. The order of performing these symbol re-coding procedures has no appreciable affect on the capability of the digital receiver to suppress co-channel interfering analog TV signal, as long as the effects of the NTSC-rejection comb filtering are not undone before data-slicing. Attempts were made in the prior art to suppress the video carrier, the chroma subcarrier and the sound carrier of a co-channel interfering analog TV signal by using comb filtering before data-slicing within the DTV receiver. However, the effects of this comb filtering on the data-slicing procedures used for symbol decoding were presumed to be compensated for by preceding performed at the DTV transmitter, rather than postcoding being performed at the DTV receiver.

Comb filtering suppresses the sound carrier of the co-channel interfering analog TV signal successfully only when the frequency of that carrier is not modulated very much. The relatively high symbol rates (10.76 MHz) compared to the frequencies of the signal modulating the sound carrier help a comb filter that combines signals differentially delayed by only twelve symbols to suppress the sound carrier of the co-channel interfering analog TV signal reasonably adequately despite frequency modulation thereof. Suppression of the sound carrier of the co-channel interfering analog TV signal is not as good when the TV sound is strongly stereophonic or second audio program (SAP) is used. The types of strong correlation and anti-correlation evident in the video content of the co-channel interfering analog TV signal between closeby horizontal scan lines, between video frames, and between component fields of video frames do not obtain for frequency-modulated sound carrier, however. So, generally, comb filters that combine signals differentially delayed by periods of a video horizontal scan line or more do not suppress the sound carrier of the co-channel interfering analog TV signal very well.

A problem in analog TV receivers is the 920 kHz beat that appears in the response of the video detector owing to intermodulation between the chroma subcarrier and the sound carrier, unless the sound carrier is removed from the final IF signal. Such 920 kHz beat in the luminance signal causes visible artifacts in the analog TV visual display that are objectionable to most viewers, so the customary practice in analog TV receiver design is to suppress, "trap filter" or "trap" the sound carrier in the IF amplifiers. The inventor points out that, in the presence of a co-channel interfering analog TV signal, 920 kHz beat arises in the final IF signal of a DTV receiver as well, owing to intermodulation between the chroma subcarrier and the sound carrier. There are other beats, as well, owing to intermodulation between the video subcarrier and the sound carrier, and owing to intermodulation between the video subcarrier and the chroma subcarrier. These beats do not directly affect luminance in the DTV visual display, so as to suggest the use of in-channel sound traps in the DTV receiver. However, these beats do affect data slicing to slight degree.

A comb filter which differentially combines DTV baseband signals that are differentially delayed by twelve symbol epochs suppresses all these beat frequencies in some degree. Such comb filter is used for post-coding in a DTV receiver designed for use with a DTV transmitter using precoding in U.S. Pat. No. 5,260,793 issued Nov. 9, 1993 to R. W. Citta et alii and entitled RECEIVER POST CODER SELECTION CIRCUIT.

The inventor points out that filtering can be used in the IF amplifiers of DTV receivers for suppressing most of the energy in the frequency-modulated sound carrier of a co-channel interfering analog TV signal, while at the same time maintaining response over the band required for proper reception of the VSB DTV signal. The filtering does not need to employ a narrowband tracking filter that follows the FM sound carrier, either, which types of filter experience difficulty following deviation caused by SAP and professional channels. The carrier frequency of a VSB DTV signal is 310 kHz above the lower limit frequency of the TV channel, and the band required for the 10.76 MHz symbol rate signal extends to a frequency 5.38 MHz higher than that carrier frequency. The upper limit frequency of the band required for proper reception of the VSB DTV signal ends 5.69 MHz above the lower limit frequency of the TV channel. The sound carrier for an analog TV signal is 5.75 MHz from the lower limit frequency of the TV channel, which is to say 250 kHz below the upper limit frequency of the TV channel. If second audio program (SAP) and professional channels are included in the co-channel interfering analog TV signal, the frequency deviation of the audio carrier can be as high as 73 kHz or more. Filtering the IF response so that it cuts off the converted frequencies beyond those 5.69 MHz above the lower limit frequency of the TV channel will suppress most of the energy in the frequency-modulated sound carrier, however. The cut-off must be quite abrupt and should be accompanied by as little departure from phase linearity as possible.

DTV receivers are commonly plural-conversion receivers. In such a DTV receiver the data carrier is upconverted to an ultra-high-frequency (UHF) intermediate-frequency signal above the frequencies assigned as UHF television broadcasting channels and then amplified in a UHF intermediate-frequency amplifier. The response of the UHF IF amplifier is downconverted to a very-high-frequency (VHF) intermediate-frequency signal below the frequencies assigned as VHF television broadcasting channels and then amplified in a VHF intermediate-frequency amplifier. The VHF IF amplifier is usually a plural-stage amplifier, at least some of its stages being subject to automatic gain control (AGC). The IF filtering desiderata set forth in the preceding paragraph could be met by using a surface-acoustic-wave (SAW) filter operative in the VHF IF band to determine overall IF bandwidth. However, since a large number of zeroes and poles are required in order to get flat-amplitude linear-phase response in the passband together with steep-slope skirts, these IF filtering desiderata are more easily met using a SAW filter operative in the UHF IF band to determine overall IF bandwidth.

Whether the data slicing done during symbol decoding is preceded by comb filtering or is not, the reduction of the sound carrier and beats arising therefrom such SAW filtering provides will reduce the energy of spurious signal accompanying the symbol coding and so reduce the error in the data-slicing procedures employed during symbol decoding. If the data slicing done during symbol decoding is preceded by comb filtering, such SAW filtering allows the use of comb filters which suppress artifacts caused by video components of a co-channel interfering analog TV signal quite well but which either do not suppress artifacts of the audio components of that signal or do not suppress those artifacts very well. A comb filter that additively combines DTV baseband signals that are differentially delayed by six symbol epochs does not suppress artifacts of the audio components of a co-channel interfering analog TV signal very much, but suppresses artifacts caused by video components of the co-channel interfering analog TV signal quite well. The artifacts caused by video components of the co-channel interfering analog TV signal are usually better suppressed than the comb filter that subtractively combines DTV baseband signals that are differentially delayed by twelve symbol epochs, since anti-correlations at six-symbol intervals are more likely to be high than correlations at twelve-symbol intervals.

SUMMARY OF THE INVENTION

The invention is embodied in a digital television signal receiver with intermediate-frequency amplifier circuitry that includes a filter for suppressing the frequency-modulated sound carrier component of co-channel interfering analog television signal accompanying multiple-level symbols descriptive of data, to reduce error in the data-slicing procedures carried out on those multiple-level symbols during symbol decoding.

When a comb filter is used before data slicing to reduce the energy of co-channel interfering NTSC television signal, the filter in the IF amplifier circuitry for suppressing the frequency-modulated sound carrier component of co-channel interfering analog television signal eases the filtering requirements on the comb filter. Accordingly, a comb filter that suppresses principally video components of co-channel interfering NTSC television signal can be employed. Particularly, a comb filter that additively combines data differentially delayed by six symbol epochs can be employed for reducing the energy of the video components of co-channel interfering NTSC television signal.

BRIEF DESCRIPTION OF THE DRAWING

FIG. 8 is a block schematic diagram of a digital television signal receiver constructed in accordance with a further aspect of the invention so as to utilize a plurality of symbol decoders operated in parallel, each preceded by a respective NTSC-rejection comb filter and succeeded by a postcoding comb filter, with the best estimate of correct symbol decoding being supplied to trellis decoding circuitry.

DETAILED DESCRIPTION

Figure 1:
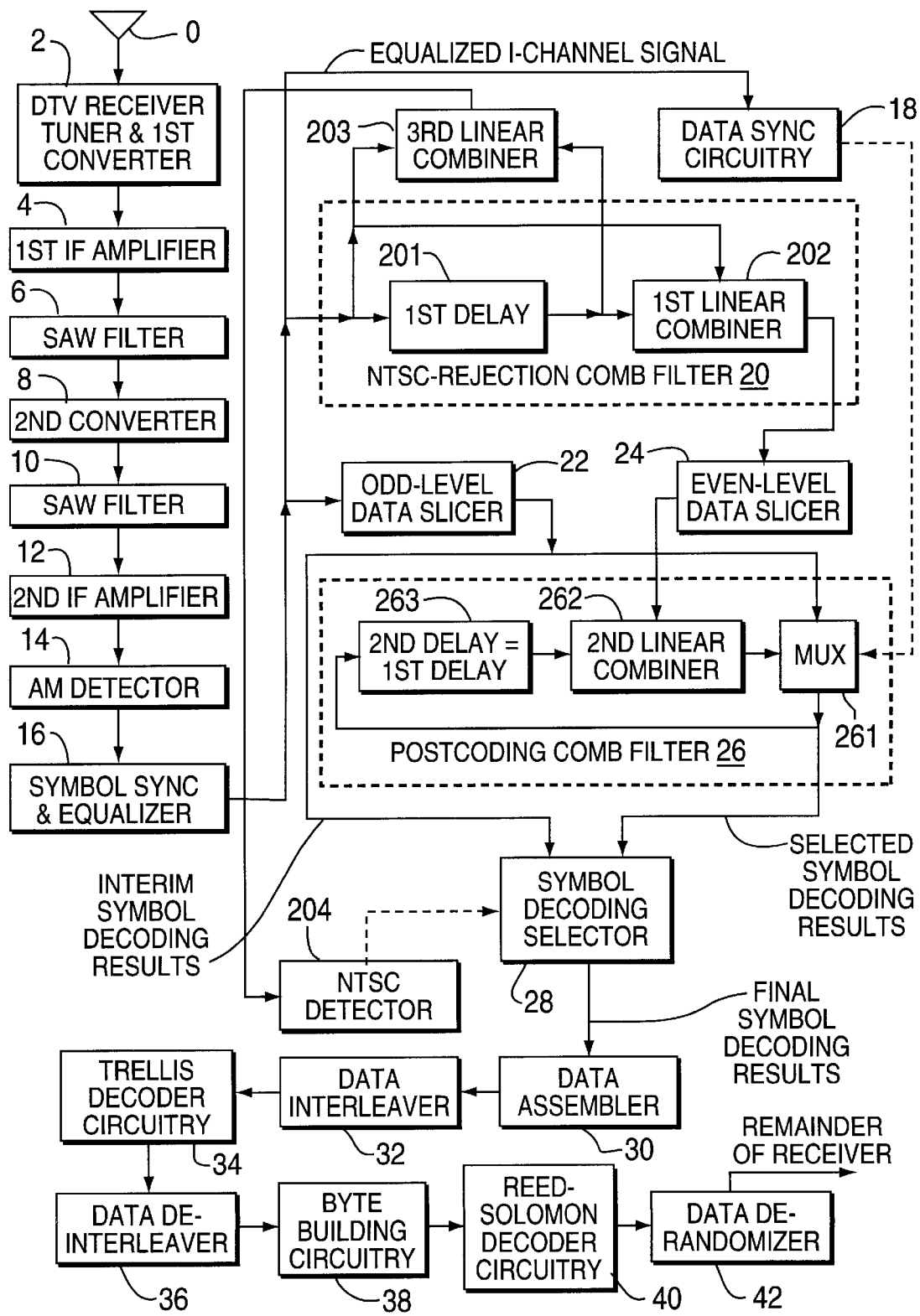
FIG. 1 is a block schematic diagram of a plural-conversion digital television signal receiver embodying the invention, using a filter in its intermediate-frequency amplifier circuitry that suppresses the FM sound carrier of any co-channel interfering analog TV signal, using an NTSC-rejection comb filter before symbol decoding that suppresses the video components of any co-channel interfering analog TV signal, and using a postcoding comb filter after symbol decoding.

FIG. 1 shows a digital television signal receiver used for recovering error-corrected data, which data are suitable for recording by a digital video cassette recorder or for MPEG-2 decoding and display in a television set. The FIG. 1 DTV signal receiver includes tuner and first converter circuitry 2 for generating a first intermediate-frequency (I-F) signal in response to received broadcast DTV signals, which FIG. 1 shows being supplied from an antenna 0. The first IF signal is in a first intermediate-frequency band located above 890 MHz, the upper limit frequency of channel 83, the highest frequency ultra-high-frequency TV broadcast channel. The tuner and first converter circuitry 2 can be similar to that used in the prior art for DTV signal receivers. The tuner input has a bandpass filter that limits the frequency range of radio-frequency input signals to the 50 to 890 MHz band, rejecting image frequencies above the first IF band. The tuner also includes a broadband tracking filter that rejects television signals other than that selected for viewing, especially those signals of higher power such as analog TV signals in next-to-adjacent channels. The first converter includes a first local oscillator for generating first local oscillations tunable over a range from 970 to 1730 MHz to place the first IF signal in a 6-MHz-wide band centered at about 920 MHz with the carrier nominally at 922.69 MHz. These first local oscillator frequencies are such that any leakage from the tuner input will not interfere with UHF TV channels as may be received by another television signal receiver nearby. At the same time second harmonics of UHF TV channels 14 through 69 fall above the first IF band. The first mixer in the first converter is a highly linear doubly-balanced type to avoid even harmonic generation, and there is a broadband tuned coupling for rejecting image frequencies in a first intermediate-frequency signal supplied from the tuner and first converter circuitry 2 to a first intermediate-frequency amplifier 4. The first IF amplifier 4 is sometimes referred to as the "UHF intermediate-frequency amplifier" or "UHF IF amplifier" since it provides amplification of signals in an ultra-high-frequency first IF band above the UHF television broadcasting channels. The first IF signal exhibits a frequency spectrum reversal relative to the RF signal supplied to the first mixer in the tuner and first converter circuitry 2.

Particularly if the first mixer does not exhibit much conversion gain, a radio-frequency (RF) amplifier is incorporated into the broadband tracking filter preceding the first mixer and is designed to have to have as much dynamic range as possible to avoid cross-modulation in the presence of strong co-channel interfering analog TV signal. The RF amplifier is provided with reverse automatic gain control to prevent non-linear operation in response to strong RF input signals, and the reverse AGC is delayed to keep noise figure high for weaker RF input signals.

The first IF amplifier 4 provides constant, linear gain to overcome the 10–12 dB insertion loss in a first surface-acoustic-wave filter 6 cascaded thereafter. The constant gain makes it simpler for the first IF amplifier 4 to drive the SAW filter 6 at all times from the source impedance prescribed for avoiding multiple reflections that interfere with obtaining good group delay. Since its gain is not automatically adjusted, the first IF amplifier 4 is designed to have as much dynamic range as possible to avoid cross-modulation of co-channel interfering analog TV signals with DTV signals.

The first SAW filter 6 response is supplied as input signal to a second converter 8, there to be mixed with second MHz local oscillations to generate DTV signals translated to a very-high-frequency second IF band below the VHF television broadcasting channels. There is a broadband tuned coupling for rejecting image frequencies in output signal from the second converter 8, which FIG. 1 shows being provided by a second SAW filter 10. Supposing that the first SAW filter 6 response is to define overall IF bandwidth, the second SAW filter 10 has an amplitude response that is substantially flat over that bandwidth and exhibits a phase response that is substantially linear. If prior art practice is followed, second local oscillations having a frequency of 876 MHz are used to supply a second mixer in the second converter 8 and the downconversion result resides in a second intermediate-frequency band located in the 41–47 MHz frequency range conventionally used as the intermediate frequency band in analog TV signal receivers of single-conversion type. As described in U.S. patent application Ser. No. 08/825,710 of C. B. Patel et alii filed Mar. 19, 1997, entitled DIGITAL TELEVISION RECEIVERS THAT DIGITIZE FINAL I-F SIGNALS RESULTING FROM TRIPLE-CONVERSION and incorporated herein by reference, the first IF band may be displaced somewhat from 917–923 MHz and the second local oscillations may be at a frequency either below or above the first IF band in frequency. If the second local oscillations are below the first IF band in frequency, like the first IF signal the second IF signal supplied from the second converter 8 exhibits a frequency spectrum reversal relative to the RF signal supplied to the first mixer in the tuner and first converter circuitry 2. If the second local oscillations are above the first IF band in frequency, the second IF signal exhibits a frequency spectrum that is not reversed relative to the RF signal supplied to the first mixer in the tuner and first converter circuitry 2.

The SAW filter 10 response is supplied as input signal to a second intermediate-frequency amplifier 12. The second IF amplifier 12 is sometimes referred to as the "VHF intermediate-frequency amplifier" or "VHF IF amplifier" since it provides amplification of signals in a very-high-frequency second IF band below the VHF television broadcasting channels. The second IF amplifier 12 has a plurality of cascaded amplifier stages, which are controlled in gain as part of a delayed, automatic-gain-control (AGC) system. An amplifier controlled in gain using AGC of reverse type generally has poorer noise figure than an amplifier controlled in gain using AGC of forward type in which amplifier stages are operated partially in a saturated condition, however. The noise figures of the stages in the second IF amplifier 12 are of less concern, owing to their later position in the amplifier chain, so these amplifier stages are preferably controlled in gain using AGC of reverse type better to keep non-linearity within reasonable limit. Controlling the gain of the second IF amplifier 12 using AGC of reverse type also makes it easier to prevent problems of phase shift as a function of change in modulation levels. In an analog TV receiver earlier IF amplifiers are preferably controlled in gain using AGC of forward type so that the video signal is free of noise that appears as "snow", particularly "color snow", on the television viewscreen. As long as noise is smaller than the smallest modulation steps in the DTV signal, so that the noise does not "capture" the data-slicing procedures used in symbol decoding, the presence of noise is of little consequence in a DTV signal receiver. The quantizing effects of the data-slicing procedures used in symbol decoding suppress the effects of noise until it exceeds the smallest modulation steps in the DTV signal. Infrequent bursts of noise that exceed the smallest modulation steps in the DTV signal can be corrected by the trellis coding and Reed-Solomon forward-error correction coding.

An amplitude-modulation detector 14 detects the amplitude modulation of the second IF amplifier 12 response to recover a baseband signal. The FIG. 1 DTV receiver differs from prior art DTV receivers in that the second intermediate-frequency band is made to exhibit an abrupt cut-off 5.4 MHz from the data carrier frequency, so the frequency-modulated NTSC audio carrier is strongly rejected in the second IF signal as amplified for application to the AM detector 14. This FM audio carrier rejection is introduced into overall IF amplifier response by the SAW filter 10 in non-preferred embodiments of the invention in which the first IF amplifier is bandlimited using ceramic resonators, rather than the SAW filter 6. This FM audio carrier rejection is also introduced into overall IF amplifier response by the SAW filter 10 in non-preferred embodiments of the invention in which the tuner and first converter circuitry 2, the first IF amplifier 4, the SAW filter 6 and the second converter 8 are replaced by tuner and single-conversion circuitry. In preferred embodiments of the invention this FM audio carrier rejection is introduced into overall IF amplifier response by the SAW filter 6 that defines the first IF band, and the SAW filter 10 is flat in amplitude and linear in phase over the second IF band, without need for particularly steep skirts.

Figure 2:
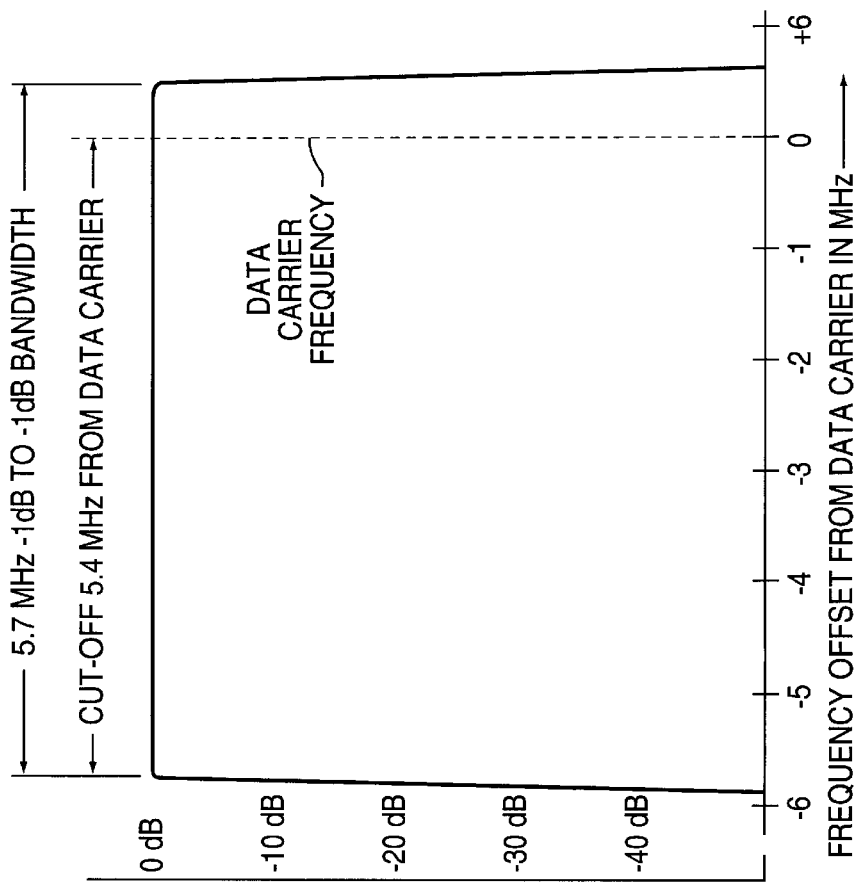
FIG. 2 is a graph of an ideal response for a bandpass filter used in the intermediate-frequency amplifier circuitry of the FIG. 1 DTV signal receiver to suppress the FM sound carrier of any co-channel interfering analog TV signal in accordance with the invention.

FIG. 2 shows the amplitude response portion of an ideal transfer characteristic for the SAW filter 6; the phase response portion of an ideal transfer characteristic for the SAW filter 6 is linear-phase throughout the passband. The ideal characteristic can be closely matched in actual practice, with some minor ripples in the passband. The SAW filter 6 cuts off rapidly just beyond 5.38 MHz remove from the suppressed carrier frequency and the pilot carrier, which is of like frequency and of fixed amplitude. This rapid cut-off can be achieved using trap filtering for the sound IF, with SAW filter 6 response exhibiting reduced attenuation at frequencies more than 5.85 MHz below data carrier frequency as translated to the first IF band. In any case, the SAW filter 6 rejects the frequency-modulated sound carrier of any co-channel interfering analog TV signal, in accordance with a principal aspect of the invention.

FIG. 2 shows that the SAW filter 6 cuts off rapidly approaching the edge of the UHF first IF band which edge is 310 kHz above data carrier frequency as translated to that first IF band. The VSB signal used for DTV differs from that used in analog TV transmission in that the roll-off of the vestigial sideband begins at frequencies below the data carrier frequency rather than above the carrier frequency. Accordingly, there is no need or desire to have −6 dB roll-off at the data carrier frequency as translated to the first IF band. This facilitates the SAW filter 6 maintaining better phase linearity through the frequency range surrounding data carrier frequency.

The baseband signal is supplied from the AM detector 14 in digital sample form to symbol synchronization and equalizer circuitry 16 as its input signal, and circuitry 16 responds to supply as an equalized output signal therefrom amplitude- and phase-equalized real baseband signal samples. These real baseband signal samples are commonly referred to in the art as an I-channel signal, "I" standing for "in-phase". Imaginary baseband signal samples are commonly referred to in the art as a Q-channel signal, "Q" standing for "quadrature-phase". Symbol synchronizer and equalizer circuitry 16 includes a digital filter with adjustable weighting coefficients that compensates for ghosts and tilt in the received signal. The symbol synchronizer and equalizer circuitry 16 provides symbol synchronization or "de-rotation" as well as amplitude equalization and ghost removal.

The amplitude-modulation detector 14 can be of a type synchronously demodulating the second IF amplifier 12 response in the analog regime, with the real baseband signal being digitized to supply the stream of digital samples of the real baseband signal, and with lowpass filter response to the Q-channel signal being used to control a local oscillator used for synchronous detection. The symbol synchronization and equalizer circuitry 16 is then realized as an amplitude-equalizer in cascade with a baseband phase-tracker.

Alternatively, the amplitude-modulation detector 14 can be of a type performing synchronous demodulation in the digital regime after analog-to-digital conversion of a final intermediate-frequency band in the few megacycle range as described for example by C. B. Patel et alii in U.S. Pat. No. 5,479,449 issued Dec. 26, 1995 and entitled DIGITAL VSB DETECTOR WITH PHASE TRACKER, AS FOR INCLUSION IN AN HDTV RECEIVER.

The digital results supplied from the symbol synchronization and equalizer circuitry 16 conventionally have 8-bit accuracy or more and describe 2N-level symbols that encode N bits of data. Currently, 2N is eight in the case where the FIG. 1 DTV signal receiver receives a through-the-air broadcast via an antenna and is sixteen in the case where the FIG. 1 DTV signal receiver receives cablecast. The concern of the invention is with the reception of terrestrial through-the-air broadcasts that are susceptible to co-channel interference from NTSC analog television signals, and FIG. 1 does not show the portions of the DTV receiver providing symbol decoding and error-correction decoding for received cablecast transmissions.

The symbol synchronizer and equalizer circuitry 16 output signal is carefully gain-controlled by any one of several known methods, so the ideal step levels for symbols are known. One method of gain control, preferred because the speed of response of such gain control is exceptionally rapid, regulates the direct component of the real baseband signal to a normalized level of +1.25. This method of gain control is generally described in U.S. Pat. No. 5,479,449 and is more specifically described by C. B. Patel et alii in U.S. patent application Ser. No. 5,573,454 filed Dec. 15, 1995 and entitled AUTOMATIC GAIN CONTROL OF RADIO RECEIVER FOR RECEIVING DIGITAL HIGH-DEFINITION TELEVISION SIGNALS. Another method of gain control with reasonably rapid speed of response is described by R. W. Citta et alii in U.S. Pat. No. 5,565,932 issued Oct. 15, 1996, entitled AGC SYSTEM WITH PILOT USING DIGITAL DATA REFERENCE and incorporated herein by reference.

The output signal from the symbol synchronizer and equalizer circuitry 16 is supplied as input signal to data sync circuitry 18, which recovers data field synchronization and data line synchronization information from the equalized baseband I-channel signal. Alternatively, the input signal to the data sync circuitry 18 can be obtained prior to equalization. The data sync circuitry 18 also supplies one or more multiplexer control signals each having two states, each multiplexer control signal exhibiting a first of those two states at selected times, but otherwise exhibiting a second of those two states.

The equalized I-channel signal samples at normal symbol rate supplied as output signal from the symbol synchronizer and equalizer circuitry 16 are applied as the input signal to an NTSC-rejection comb filter 20. The comb filter 20 includes a first delay device 201 to generate a pair of differentially delayed streams of the 2N-level symbols and a first linear combiner 202 for linearly combining the differentially delayed symbol streams to generate the comb filter 20 response. As described in U.S. Pat. No. 5,260,793, the first delay device 201 can provide a delay equal to the period of twelve 2N-level symbols, and the first linear combiner 202 can be a subtractor. Each sample of the comb filter 20 output signal is resolved to ten or more bits and is, in effect, a digital description of an analog symbol exhibiting one of (4N−1)=15 levels.

The symbol synchronizer and equalizer circuitry 16 is presumed be designed to suppress the direct bias component of its input signal (as expressed in digital samples), which direct bias component has a normalized level of +1.25 and appears in the real baseband signal supplied from the complex demodulator 14 owing to detection of the pilot carrier. Accordingly, each sample of the circuitry 16 output signal applied as comb filter 20 input signal is, in effect, a digital description of an analog symbol exhibiting one of the following normalized levels: −−7, −5, −3 −1, +1, +3, +5 and +7. These symbol levels are denominated as "odd" symbol levels and are detected by an odd-level data slicer 22 to generate interim symbol decoding results of 000, 001, 010, 0 11, 100, 101 110 and 111, respectively.

Each sample of the comb filter 20 output signal is, in effect, a digital description of an analog symbol exhibiting one of the following normalized levels: −14, −12, −10, −8, −6, −4, −2, 0, +2, +4, +6, +8, +10, +12 and +14. These symbol levels are denominated as "even" symbol levels and are detected by an even-level data slicer 24 to generate supplementary symbol decoding results of 001, 010, 011, 100, 101, 110, 111, 000, 001, 010, 011, 100, 101, 110, and 111, respectively.

A comb filter 26 is used after the data slicers 22 and 24 to generate a postcoder response to the precoder response of the comb filter 20 insofar as symbols are concerned. The postcoding comb filter 26 includes a 2-input multiplexer 261, a second linear combiner 262, and a second delay device 263 with delay equal to that of the first delay device 201 in the comb filter 20. The second linear combiner 262 is a modulo-8 adder if the first linear combiner 202 is a subtractor and is a modulo-8 subtractor if the first linear combiner 202 is an adder. The first linear combiner 202 and the second linear combiner 262 may be constructed as respective read-only memories (ROMs) to speed up linear combination operations sufficiently to support the sample rates involved.

The output signal of the multiplexer 261 reproduces one of the two input signals applied to the multiplexer 261, as controlled by a respective multiplexer control signal that comprises postcoding initialization signals supplied to the multiplexer 261 from the data sync circuitry 18. The first input signal to the multiplexer 261 corresponds to the interim symbol decoding results supplied from the odd-level data slicer 22, and the multiplexer 261 is conditioned by its respective multiplexer control signal the being in the first of its two states to reproduce the interim symbol decoding results as its output signal. The second input signal to the multiplexer 261 corresponds to second linear combining results supplied from a second linear combiner 262, and the multiplexer 261 is conditioned by its respective multiplexer control signal the being in the second of its two states to reproduce the second linear combining results as its output signal. The output signal from the multiplexer 261 furnishes the response from the postcoding comb filter 26 and is delayed by the second delay device 263. The second linear combiner 262 combines the supplementary symbol decoding results from the even-level data slicer 24 with the output signal from the second delay device 263.

The FIG. 1 DTV receiver uses the first delay device 201 in combination with a third linear combiner 203 to provide an NTSC-extraction filter. This NTSC-extraction filter is a comb filter with a filter response complementary to that of the NTSC-rejection comb filter 20. If the first linear combiner 201 is a subtractor, then the third linear combiner 203 is an adder. If the first linear combiner 201 is a subtractor, then the third linear combiner 203 is an adder. The NTSC-extraction filter response supplied as the output signal from the third linear combiner 203 is supplied to an NTSC detector 204, which decides whether or not the energy of NTSC co-channel interference in that signal is substantial in level, so as to cause data-slicing to be likely to be in error. The NTSC detector 204 cores the portion of its input signal that may be attributable to data symbols accompanied by normal levels of Johnson noise, rectifies the coring results, integrates the rectified coring results over prescribed time intervals, and determines whether the integration results exceed a threshold value indicating that the energy of NTSC co-channel interference in that signal is substantial in level. A first state of the NTSC detector 204 output signal, which is indicative that co-channel interfering analog TV signal is not of substantial level, conditions the selector 28 to reproduce, as its output signal, the interim symbol decoding results from the odd-level data slicer 22. If the co-channel interfering analog TV signal is determined to be of substantial level, the NTSC detector 204 output signal is in a second of its two possible states, which conditions the selector 28 to reproduce the comb filter 26 response as its output signal.

The NTSC detector 204 is replaced in alternative embodiments of the invention by an NTSC detector of the type described in U.S. Pat. No. 5,260,793 issued Nov. 9, 1993 to R. W. Citta et alii and entitled RECEIVER POST CODER SELECTION CIRCUIT. Such replacement NTSC detector compares received data field synchronization signals with ideal data field synchronization signals to isolate artifacts of NTSC co-channel interfering signal which are rectified. The rectified artifacts are then integrated over prescribed time intervals, and it is determined whether the integration results exceed a threshold value indicating that the energy of NTSC co-channel interference in that signal is substantial in level.

The NTSC detector 204 is replaced in still other embodiments of the invention by an NTSC detector that relies on an analog TV signal receiver to supply it response to NTSC co-channel interfering signal. In certain of these still other embodiments of the invention this response to NTSC co-channel interfering signal is taken from composite video signal supplied by the analog TV signal receiver as described in detail by the inventor in U.S. patent application Ser. No. 08/821,944 filed Mar. 21, 1997 and entitled USING VIDEO SIGNALS FROM AUXILIARY ANALOG TV RECEIVERS FOR DETECTING NTSC INTERFERENCE IN DIGITAL TV RECEIVERS. In other of these still other embodiments of the invention this response to NTSC co-channel interfering signal is taken from intercarrier sound signal supplied by the analog TV signal receiver as described in detail by the inventor in U.S. patent application Ser. No. 08/821,945 filed Mar. 21, 1997 and entitled USING INTERCARRIER SIGNALS FOR DETECTING NTSC INTERFERENCE IN DIGITAL TV RECEIVERS.

The output signal from the symbol decoding selector 28 comprises the final symbol decoding results in 3-parallel-bit groups, assembled by a data assembler 30 for application to a data interleaver 32. The data interleaver 32 commutates the assembled data into parallel data streams for application to trellis decoder circuitry 34. Trellis decoder circuitry 34 conventionally uses twelve trellis decoders. The trellis decoding results are supplied from the trellis decoder circuitry 34 to data de-interleaver circuitry 36 for de-commutation. Byte parsing circuitry 38 converts the data interleaver 36 output signal into bytes of Reed-Solomon error-correction coding for application to Reed-Solomon decoder circuitry 40, which performs Reed-Solomon decoding to generate an error-corrected byte stream supplied to a data de-randomizer 42. The data de-randomizer 42 supplies reproduced data to the remainder of the receiver (not shown). The remainder of a complete DTV receiver will include a packet sorter, an audio decoder, an MPEG-2 decoder and so forth. The remainder of a DTV signal receiver incorporated in a digital tape recorder/reproducer will include circuitry for converting the data to a form for recording.

The symbol synchronizer and equalizer circuitry 16 is presumed in the foregoing description to be designed to suppress the direct bias component of its input signal (as expressed in digital samples), which direct bias component has a normalized level of +1.25 and appears in the real baseband signal supplied from the synchrodyne and analog-to-digital conversion circuitry 14 owing to detection of the pilot carrier. Alternatively, the symbol synchronizer and equalizer circuitry 16 is designed to preserve the direct bias component of its input signal, which simplifies the design of the equalization filter in the circuitry 16 somewhat. In such case the data-slicing levels in the odd-level data slicer 22 are offset to take into account the direct bias component accompanying the data steps in its input signal. Providing that the first linear combiner 202 is a subtractor, whether the circuitry 16 is designed to suppress or to preserve the direct bias component of its input signal has no consequence in regard to the data-slicing levels in the even-level data slicer 24. However, if the differential delay provided by the first delay device 201 is chosen so that the first linear combiner 202 is an adder, the data-slicing levels in the even-level data slicer 24 should be offset to take into account the doubled direct bias component accompanying the data steps in its input signal.

Embodiments of the invention are possible in which one data slicer replaces the odd-level data slicer 22 and the even-level data slicer 24 with a single data slicer, using multiplexer connections to shift its place in circuit and to provide bias to modify its slicing ranges, but these arrangements are not preferred because of the complexity of operation.

Also, embodiments of the invention are possible in which the symbol decoding selector 28 is dispensed with and final symbol decoding results are supplied to the data assembler 30 directly from the multiplexer 261. In such embodiments the signal for controlling selection by the multiplexer 261 is supplied by logic circuitry that combines the postcoding initialization signals from the data sync circuitry 18 and the indications of co-channel interfering NTSC signal from the NTSC detector 204.

In less preferred embodiments of the invention, the SAW filter 10 is relocated from its preferred position at the input of the second IF amplifier 12 to a later position in the second IF amplifier 12, even to its output. These locations of the SAW filter 10 make it more likely that unwanted cross-modulation will occur between the DTV signal and the FM sound carrier of a co-channel interfering analog TV signal. In other embodiments of the invention, the second converter 8 may combine the amplified first IF signal with local oscillations at 964 MHz or so to result in a 41–47 MHz second IF signal with the data carrier just above 41 MHz and the full sideband extending up toward 47 MHz. Using local oscillations at 876 MHz in the second converter 8 is preferred because the cut-off in frequency response to reject the FM sound carrier of the co-channel interfering signal is at a lower frequency, making the design of the SAW filter 10 somewhat easier.

Figure 3:
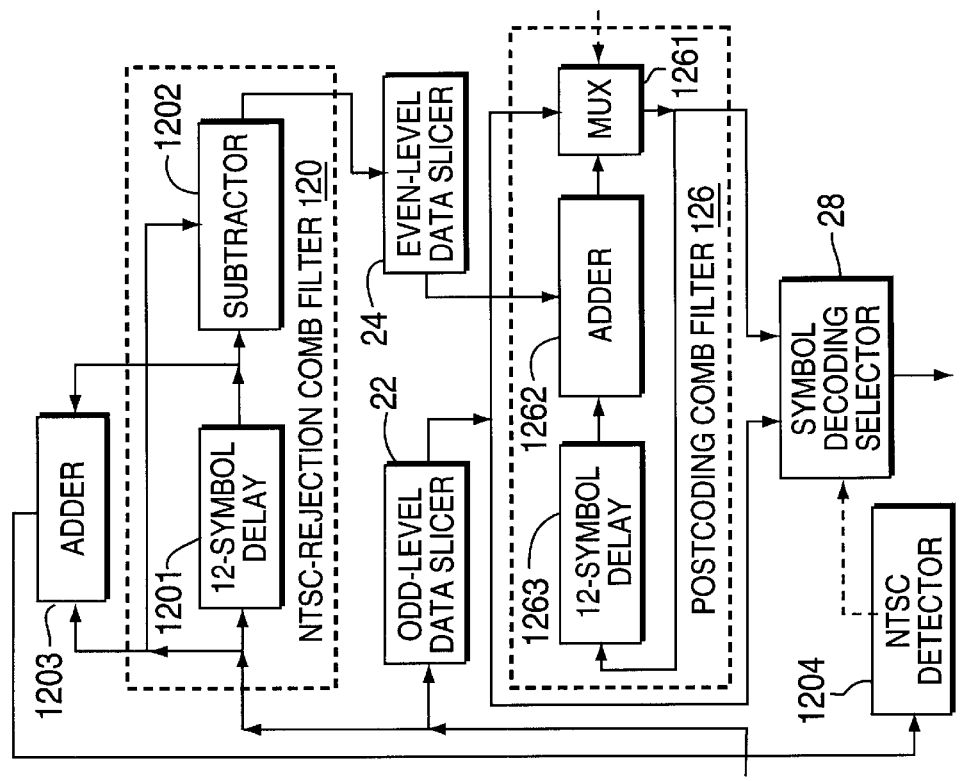
FIG. 3 is a block schematic diagram showing details of a portion of the FIG. 1 DTV signal receiver when the NTSC-rejection comb filter employs a 12-symbol delay.

FIG. 3 is a block schematic diagram showing details of a portion of the FIG. 1 DTV signal receiver using a species 120 of the NTSC-rejection comb filter 20 and a species 126 of the postcoding comb filter 26. A subtractor 1202 serves as the first linear combiner in the NTSC-rejection comb filter 120, and a modulo-8 adder 1262 serves as the second linear combiner in the postcoding comb filter 126. The NTSC-rejection comb filter 120 uses a first delay device 1201 exhibiting a delay of twelve symbol epochs, and the postcoding comb filter 126 uses a second delay device 1263 also exhibiting a delay of twelve symbol epochs. The 12-symbol delay exhibited by each of the delay devices 1201 and 1263 is close to one cycle delay of the artifact of the analog TV video carrier at 59.75 times the analog TV horizontal scan frequency $f_H$. The 12-symbol delay is close to five cycles of the artifact of the analog TV chrominance subcarrier at 287.25 times $f_H$. The 12-symbol delay is close to six cycles of the artifact of the analog TV sound carrier at 345.75 times $f_H$. This is the reason that the differentially combined response of the subtractor 1202 to the sound carrier, to the video carrier and to frequencies close to chrominance subcarrier differentially delayed by the first delay device 1201 tends to have reduced co-channel interference. However, in portions of a video signal in which edges cross a horizontal scan line, the amount of correlation in the analog TV video signal at such distances in the horizontal spatial direction is quite low.

A species 1261 of the multiplexer 261 is controlled by a multiplexer control signal that is in its first state for twelve symbol epochs at the beginning of each data segment. At other times the multiplexer 1261 control signal is in its second state, provided there is no indication supplied during data slicing or the trellis decoding operations that a symbol decoding result used to form a particular one of the twelve interleaved trellis codes is very likely to have been corrupted. When such indication is supplied, particularly during the earlier portion of a data segment, the multiplexer control signal can be placed into its first state the twelfth following symbol epoch. This will help forestall long running errors that are characteristic of differential coding schemes.

An adder 1203 combines with the first delay device 1201 to provide an NTSC-extraction filter response as sum output signal from the adder 1203. This NTSC-extraction filter response is complementary to the NTSC-rejection filter 120 response provided as difference output signal from the subtractor 1202 and is supplied to an NTSC detector 1204. If the NTSC detector 1204 decides that the level of interfering co-channel analog TV signal is not substantial, the NTSC detector 1204 output signal is placed into its first state, which conditions the symbol decoding selector 28 to select the current interim symbol decoding result from the data slicer 22 as the current final symbol decoding result. If the NTSC detector 1204 decides that the level of interfering co-channel analog TV signal is substantial, the NTSC detector 1204 output signal is placed into its second state, which conditions the symbol decoding selector 28 to select the current selected symbol decoding result from the postcoding comb filter 126 as the current final symbol decoding result.

Figure 4:
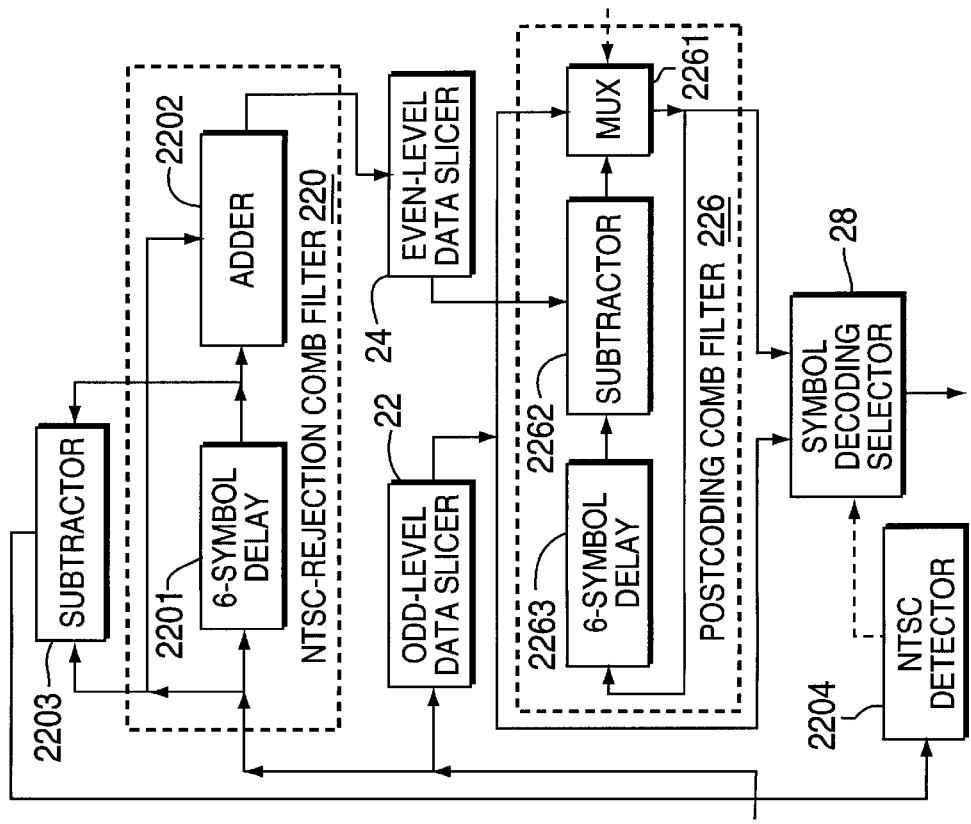
FIG. 4 is a block schematic diagram showing details of a portion of the FIG. 1 DTV signal receiver when the NTSC-rejection comb filter employs a 6-symbol delay.

FIG. 4 is a block schematic diagram showing details of a portion of the FIG. 1 DTV signal receiver using a species 220 of the NTSC-rejection comb filter 20 and a species 226 of the postcoding comb filter 26. The NTSC-rejection comb filter 220 uses a first delay device 2201 exhibiting a delay of six symbol epochs, and the postcoding comb filter 226 uses a second delay device 2263 also exhibiting a delay of six symbol epochs. The 6-symbol delay exhibited by each of the delay devices 2201 and 2263 is close to 0.5 cycle delay of the artifact of the analog TV video carrier at 59.75 times the analog TV horizontal scan frequency $f_H$, close to 2.5 cycles of the artifact of the analog TV chrominance subcarrier at 287.25 times $f_H$, and close to 3 cycles of any artifact of the analog TV sound carrier at 345.75 times $f_H$. An adder 2202 serves as the first linear combiner in the NTSC-rejection comb filter 220, and a modulo-8 subtractor 2262 serves as the second linear combiner in the postcoding comb filter 226. Since the delay exhibited by the delay devices 2201 and 2263 is shorter than the delay exhibited by the delay devices 1201 and 1263, although nulls near frequencies converted from analog TV carrier frequencies are narrower band, there is more likely to be good anti-correlation in the signals additively combined by the adder 2202 than there is likely to be good correlation in the signals differentially combined by the subtractor 1202. The suppression of the sound carrier is poorer in the NTSC-rejection comb filter 220 response than in the NTSC-rejection comb filter 120 response. However, if the sound carrier of a co-channel interfering analog TV signal has been suppressed by SAW filtering or a sound trap in the "front end" electronics 10, the poor sound rejection of the comb filter 220 is not a problem. The responses to sync tips is reduced in duration using the NTSC-rejection comb filter 220 of FIG. 4 rather than the NTSC-rejection comb filter 120 of FIG. 3, so there is substantially reduced tendency to overwhelm error-correction in the trellis decoding and Reed-Solomon coding.

A species 2261 of the multiplexer 261 is controlled by a multiplexer control signal that is in its first state for six symbol epochs at the beginning of each data segment. At other times the multiplexer 2261 control signal is in its second state, provided there is no indication supplied during data slicing or the trellis decoding operations that a symbol decoding result is very likely to have been corrupted. When such indication is supplied, particularly during the earlier portion of a data segment, the multiplexer control signal can be placed into its first state the sixth following symbol epoch. This will help forestall long running errors that are characteristic of differential coding schemes.

A subtractor 2203 combines with the first delay device 2201 to provide an NTSC-extraction filter response as difference output signal from the subtractor 2203. This NTSC-extraction filter response, supplied to an NTSC detector 2204 as input signal thereto, is complementary to the NTSC-rejection filter 220 response provided as sum output signal from the adder 2202 and has no direct component resulting from the pilot carrier component of the VSB DTV signal being synchrodyned to baseband. If the NTSC detector 2204 decides that the level of interfering co-channel analog TV signal is not substantial, the NTSC detector 2204 output signal is placed into its first state, which conditions the symbol decoding selector 28 to select the current interim symbol decoding result from the data slicer 22 as the current final symbol decoding result. If the NTSC detector 2204 decides that the level of interfering co-channel analog TV signal is substantial, the NTSC detector 2204 output signal is placed into its second state, which conditions the symbol decoding selector 28 to select the current selected symbol decoding result from the postcoding comb filter 226 as the current final symbol decoding result.

Figure 5:
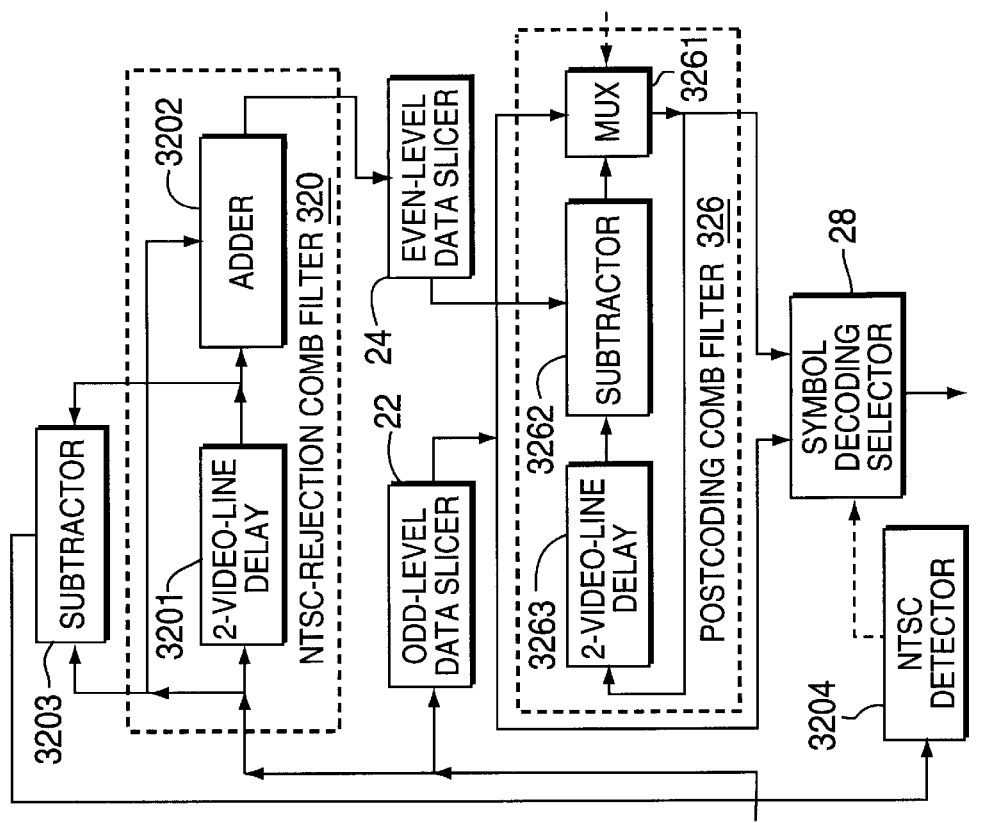
FIG. 5 is a block schematic diagram showing details of a portion of the FIG. 1 DTV signal receiver when the NTSC-rejection comb filter employs a 2-video-line delay.

FIG. 5 is a block schematic diagram showing details of a portion of the FIG. 1 DTV signal receiver using a species 320 of the NTSC-rejection comb filter 20 and a species 326 of the postcoding comb filter 26. The NTSC-rejection comb filter 320 uses a first delay device 3201 exhibiting a delay of 1368 symbol epochs, which delay is substantially equal to the epoch of two horizontal scan lines of an analog TV signal, and the postcoding comb filter 326 uses a second delay device 3263 also exhibiting such delay. The first linear combiner in the NTSC-rejection comb filter 320 is a subtractor 3202, and the second linear combiner in the postcoding comb filter 326 is a modulo-8 adder 3262. A species 3261 of the multiplexer 261 is controlled by a multiplexer control signal that is in its first state during a portion of the first data segment in each data field, which portion is known a priori at the DTV receiver. The symbol codes applied as input signal to the delay device 3261 device during this portion of the first data segment in each data field can be corrected when necessary. At other times the multiplexer 3261 control signal is in its second state, provided there is no indication supplied during data slicing or the trellis decoding operations that a symbol decoding result is very likely to have been corrupted. When such indication is supplied, particularly during the earlier portion of a data field, the multiplexer control signal can be placed into its first state the 1368th following symbol epoch. This will help forestall long running errors that are characteristic of differential coding schemes.

An adder 3203 combines with the first delay device 3201 to provide an NTSC-extraction filter response as sum output signal from the adder 3203. This NTSC-extraction filter response, supplied to an NTSC detector 3204 as input signal thereto, is complementary to the NTSC-rejection filter 320 response provided as difference output signal from the subtractor 3202 If the NTSC detector 3204 decides that the level of interfering co-channel analog TV signal is not substantial, the NTSC detector 3204 output signal is placed into its first state, which conditions the symbol decoding selector 28 to select the current interim symbol decoding result from the data slicer 22 as the current final symbol decoding result. If the NTSC detector 3204 decides that the level of interfering co-channel analog TV signal is substantial, the NTSC detector 3204 output signal is placed into its second state, which conditions the symbol decoding selector 28 to select the current selected symbol decoding result from the postcoding comb filter 326 as the current final symbol decoding result.

The FIG. 5 NTSC-rejection comb filter 320 is quite good in suppressing demodulation artifacts generated in response to analog TV horizontal synchronizing pulses, as well as suppressing many of the demodulation artifacts generated in response to analog TV vertical synchronizing pulses and equalizing pulses. These artifacts are the co-channel interference with highest energy. Except where there is scan-line-to-scan-line change in the video content of the analog TV signal over the period of two scan lines, the NTSC-rejection comb filter 320 provides reasonably good suppression of that video content regardless of its color. The suppression of the FM sound carrier of the analog TV signal is reasonably good, in case it has not been suppressed by a tracking rejection filter in the symbol synchronization and equalization circuitry 16. Artifacts of most analog TV color bursts are suppressed in the NTSC-rejection comb filter 320 response, too. Furthermore, the filtering provided by the NTSC-rejection comb filter 320 is "orthogonal" to the NTSC-interference rejection built into the trellis decoding procedures.

A modification that can be made to the portion of the FIG. 1 DTV signal receiver shown in FIG. 5 is to replace the multiplexer 3261 with a three-input multiplexer permitting correct symbol codes for the portion of the first data segment in each data field known a priori at the DTV signal receiver to be selected from a memory in the receiver.

Figure 6:
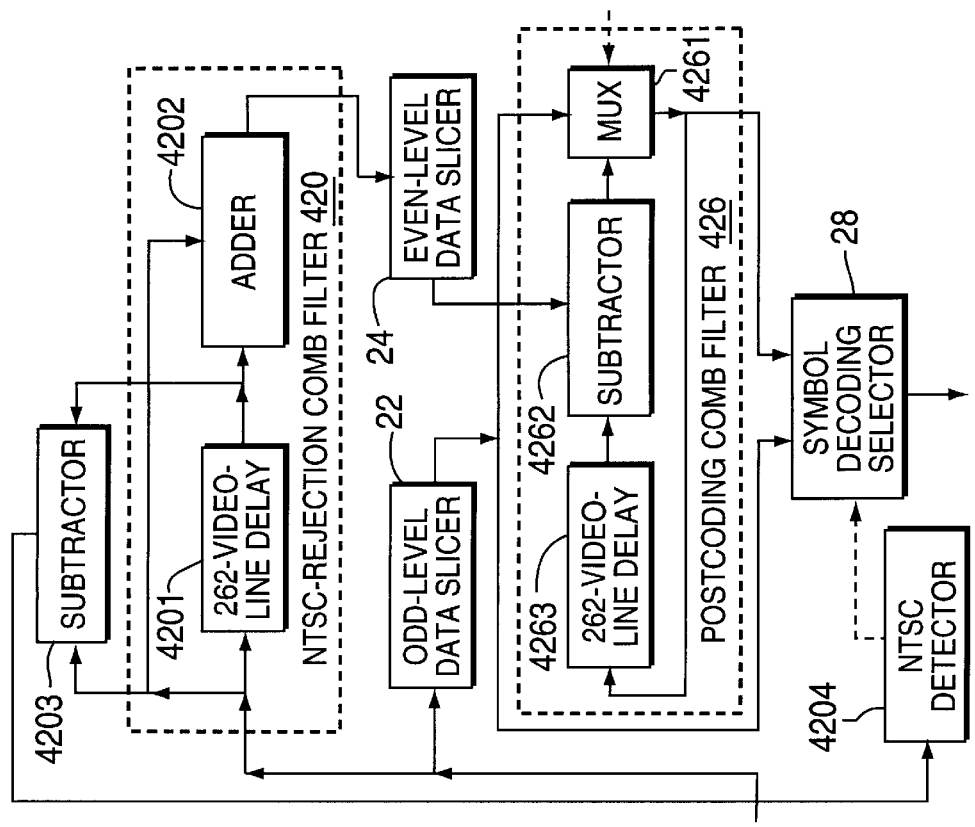
FIG. 6 is a block schematic diagram showing details of a portion of the FIG. 1 DTV signal receiver when the NTSC-rejection comb filter employs a 262-video-line delay.

FIG. 6 is a block schematic diagram showing details of a portion of the FIG. 1 DTV signal receiver using a species 420 of the NTSC-rejection comb filter 20 and a species 426 of the postcoding comb filter 26. The NTSC-rejection comb filter 420 uses a first delay device 4201 exhibiting a delay of 179,208 symbol epochs, which delay is substantially equal to the period of 262 horizontal scanning lines of an analog TV signal, and the postcoding comb filter 426 uses a second delay device 4261 also exhibiting such delay. A subtractor 4202 serves as the first linear combiner in the NTSC-rejection comb filter 420, and a modulo-8 adder 4262 serves as the second linear combiner in the postcoding comb filter 426.

A species 4261 of the multiplexer 461 is controlled by a multiplexer control signal that is in its first state when field-to-field motion for an analog TV pixel associated with the current symbol epoch is detected. At other times the multiplexer 4261 control signal is in its second state, provided there is no indication supplied during data slicing or the trellis decoding operations that a symbol decoding result is very likely to have been corrupted. When such indication is supplied a prescribed number of times, the multiplexer control signal can be placed into its first state the 179,208th following symbol epoch. This will help forestall plural-frame running errors for each particular analog TV pixel. Indications of error can also be generated during a portion of the first data segment in each data field, which portion is known a priori at the DTV receiver, and the symbol codes applied as input signal to the delay device by the second delay device 4261 can be corrected when necessary.

An adder 4203 combines with the first delay device 4201 to provide an NTSC-extraction filter response as sum output signal from the adder 4203. This NTSC-extraction filter response, supplied to an NTSC detector 4204 as input signal thereto, is complementary to the NTSC-rejection filter 420 response provided as difference output signal from the subtractor 4202 If the NTSC detector 4204 decides that the level of interfering co-channel analog TV signal is not substantial, the NTSC detector 4204 output signal is placed into its first state, which conditions the symbol decoding selector 28 to select the current interim symbol decoding result from the data slicer 22 as the current final symbol decoding result. If the NTSC detector 4204 decides that the level of interfering co-channel analog TV signal is substantial, the NTSC detector 4204 output signal is placed into its second state, which conditions the symbol decoding selector 28 to select the current selected symbol decoding result from the postcoding comb filter 426 as the current final symbol decoding result.

The FIG. 6 NTSC-rejection comb filter 420 suppresses most demodulation artifacts generated in response to analog TV vertical synchronizing pulses and equalizing pulses, as well as suppressing all the demodulation artifacts generated in response to analog TV horizontal synchronizing pulses. These artifacts are the co-channel interference with highest energy. Also, the NTSC-rejection comb filter 420 suppresses artifacts arising from the video content of the analog TV signal that does not change from field to field or line-to-line, getting rid of stationary patterns irrespective of their horizontal spatial frequency or color. Artifacts of most analog TV color bursts are suppressed in the NTSC-rejection comb filter 420 response, too.

Figure 7:
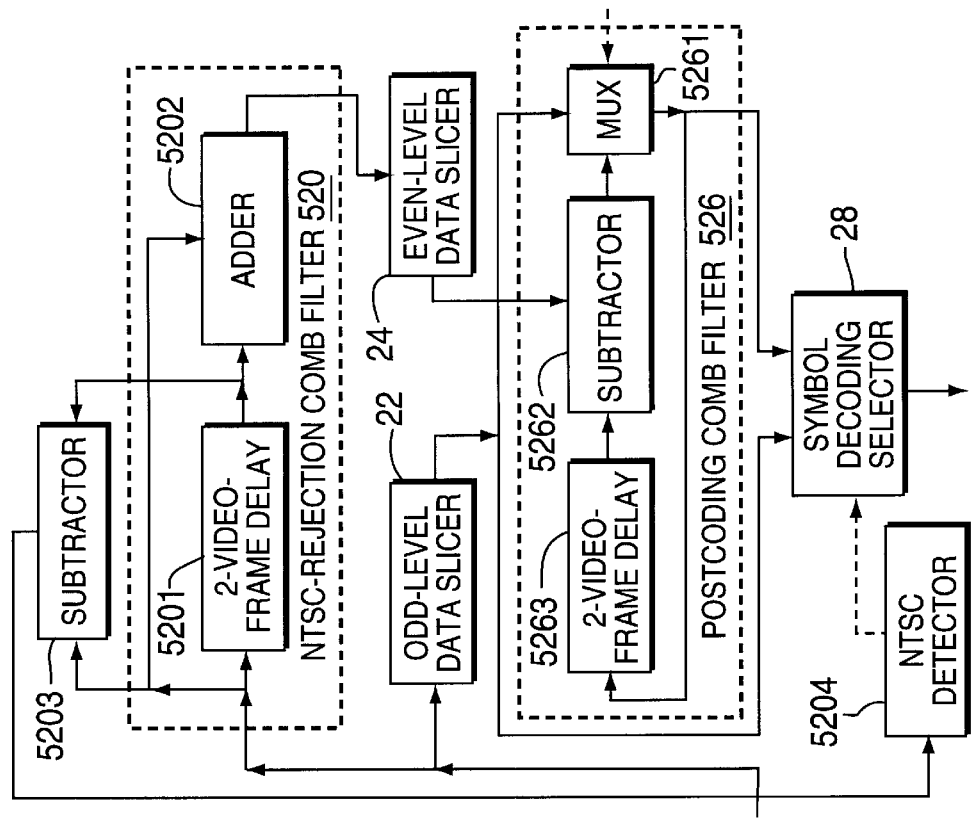
FIG. 7 is a block schematic diagram showing details of a portion of the FIG. 1 DTV digital television signal receiver when the NTSC-rejection comb filter employs a 2-video-frame delay.

FIG. 7 is a block schematic diagram showing details of a portion of the FIG. 1 DTV signal receiver using a species 520 of the NTSC-rejection comb filter 20 and a species 526 of the postcoding comb filter 26. The NTSC-rejection comb filter 520 uses a first delay device 5201 exhibiting a delay of 718,200 symbol epochs, which delay is substantially equal to the period of two frames of an analog TV signal, and the postcoding comb filter 526 uses a second delay device 5261 also exhibiting such delay. A subtractor 5202 serves as the first linear combiner in the NTSC-rejection comb filter 520, and a modulo-8 adder 5262 serves as the second linear combiner in the postcoding comb filter 526.

A species 5261 of the multiplexer 261 is controlled by a multiplexer control signal that is in its first state when frame-to-frame motion for an analog TV pixel associated with the current symbol epoch is detected. At other times the multiplexer 5261 control signal is in its second state, provided there is no indication supplied during data slicing or the trellis decoding operations that a symbol decoding result is very likely to have been corrupted. When such indication is supplied a prescribed number of times, the multiplexer control signal can be placed into its first state the 718,200th following symbol epoch. This will help forestall plural-frame running errors for each particular analog TV pixel. Indications of error can also be generated during a portion of the first data segment in each data field, which portion is known a priori at the DTV receiver, and the symbol codes applied as input signal to the delay device by the second delay device 5261 can be corrected when necessary.

An adder 5203 combines with the first delay device 5201 to provide an NTSC-extraction filter response as sum output signal from the adder 5203. This NTSC-extraction filter response, supplied to an NTSC detector 5204 as input signal thereto, is complementary to the NTSC-rejection filter 520 response provided as difference output signal from the subtractor 5202 the pilot carrier component of the VSB DTV signal being synchrodyned to baseband. If the NTSC detector 5204 decides that the level of interfering co-channel analog TV signal is not substantial, the NTSC detector 5204 output signal is placed into its first state, which conditions the symbol decoding selector 28 to select the current interim symbol decoding result from the data slicer 22 as the current final symbol decoding result. If the NTSC detector 5204 decides that the level of interfering co-channel analog TV signal is substantial, the NTSC detector 5204 output signal is placed into its second state, which conditions the symbol decoding selector 28 to select the current selected symbol decoding result from the postcoding comb filter 526 as the current final symbol decoding result.

The FIG. 7 NTSC-rejection comb filter 520 suppresses all demodulation artifacts generated in response to analog TV vertical synchronizing pulses and equalizing pulses, as well as suppressing all the demodulation artifacts generated in response to analog TV horizontal synchronizing pulses. These artifacts are the co-channel interference with highest energy. Also, the NTSC-rejection comb filter 520 suppresses artifacts arising from the video content of the analog TV signal that does not change over two frames, getting rid of such very stationary patterns irrespective of their spatial frequency or color. Artifacts of all analog TV color bursts are suppressed in the NTSC-rejection comb filter 520 response, too.

One skilled in the art of television system design will discern other properties of correlation and anti-correlation in analog TV signals that can be exploited in the design of NTSC-rejection filters of still other types than those shown in FIGS. 3–7. For example, comb filters with differential delays of 681 symbol epochs and with delays of 687 symbol epochs can be useful in suppressing analog TV signals with little chroma content. The use of NTSC-rejection filters that cascade two NTSC-rejection filters of the types already disclosed increases the 2N levels of the baseband signals to (8N–1) data levels. Such filters may be required to overcome particularly bad co-channel interference problems despite their shortcoming of reducing signal-to-noise for random noise interference with symbol decoding.

FIG. 8 shows a modification of a digital television signal receiver as thusfar described, constructed in accordance with a further aspect of the invention so as to utilize a plurality of symbol decoders operated in parallel, each preceded by a respective NTSC-rejection comb filter and succeeded by a postcoding comb filter. The prefixes A, B and C in the identification numbers for the elements of FIG. 8 are different integers which will correspond to respective ones of the integers 1, 2, 3, 4 and 5 when receiver portions as shown in ones of FIGS. 3–7 are employed. The data sync circuitry 18 and its control connections to the postcoding comb filters A26, B26 and C26 are of the sort shown in FIG. 1 and are omitted from FIG. 8 to avoid excessive detail. The symbol decoding selector 28 that has no decision-making capability of its own is replaced with symbol decoding selection circuitry 028. The symbol decoding selection circuitry 028 has decision-making capability of its own and supplies a best estimate of correct symbol decoding for application to the trellis decoding circuitry 34.

An NTSC detector A204 of a first type determines whether co-channel interference from an analog TV signal is such that a first NTSC-rejection filter A20 of a first type will be effective in reducing that interference substantially. The NTSC detector A204 cores first NTSC-extraction filter response from the linear combiner A203 to remove signal excursions within the expected range for symbol levels. The energy of the cored response is then measured to generate an indication to of how effective the NTSC-rejection filter A20 of first type will be in reducing current co-channel interference, which indication is supplied from the NTSC detector A204 to the symbol decoding selection circuitry 028.

An NTSC detector B204 of a second type determines whether co-channel interference from an analog TV signal is such that a second NTSC-rejection filter B20 of a second type will be effective in reducing that interference substantially. The NTSC detector B204 cores second NTSC-extraction filter response from the linear combiner B203 to remove signal excursions within the expected range for symbol levels. The energy of the cored response is then measured to generate an indication to of how effective the NTSC-rejection filter B20 of second type will be in reducing current co-channel interference, which indication is supplied from the NTSC detector B204 to the symbol decoding selection circuitry 028.

An NTSC detector C204 of a third type determines whether co-channel interference from an analog TV signal is such that a third NTSC-rejection filter A20 of a third type will be effective in reducing that interference substantially. The NTSC detector C204 cores third NTSC-extraction filter response from the linear combiner C203 to remove signal excursions within the expected range for symbol levels. The energy of the cored response is then measured to generate an indication to of how effective the NTSC-rejection filter C20 of third type will be in reducing current co-channel interference, which indication is supplied from the NTSC detector C204 to the symbol decoding selection circuitry 028.

The odd-level data-slicer 22 supplies interim symbol decoding results to a postcoding comb filter A26 of a first type, to a postcoding comb filter B26 of a second type, and to a postcoding comb filter C26 of a third type. An even-level data-slicer A24 converts the response of the NTSC-rejection filter A20 to first supplemental symbol decoding results for application to the postcoding comb filter A26. An even-level data-slicer B24 converts the response of the NTSC-rejection filter B20 to second supplemental symbol decoding results for application to the postcoding comb filter B26. An even-level data-slicer C24 converts the response of the NTSC-rejection filter C20 to third supplemental symbol decoding results for application to the postcoding comb filter C26.

The symbol decoding selector 028 includes voting circuitry for polling the symbol codes supplied from the odd-level data slicer 22, the postcoding comb filter A26 of first type, the postcoding comb filter B26 of second type, and the postcoding comb filter C26 of third type. If all four of the symbol decoding results concur, the symbol decoding result concurred to is supplied to the trellis coder circuitry 34. If the symbol decoding results supplied from the odd-level data slicer 22, the postcoding comb filter A26 of first type, the postcoding comb filter B26 of second type, and the postcoding comb filter C26 of third type do not concur a simple voting procedure can be carried out by the voting circuitry to select the decoding result least likely to be in error.

More accurate symbol decoding will be obtained more of the time if a weighted voting procedure is followed in the voting circuitry. The weights for voting can be determined solely from the indications supplied from the NTSC detectors A204, B204 and C204. This avoids the need for replicating the trellis decoder circuitry 34. This procedure can be modified to take into account the variances of the decoding results, reducing the weight accorded a decoding result in the voting procedure if it departs from a decoding result concurred in by a majority of the other symbol decoding circuits.

The trellis decoder circuitry 34 may be replicated and the relative success of various symbol decoding decisions can be compared to refine the best estimate of symbol decoding result further. This involves considerably more digital hardware, however.

The best estimate of symbol decoding results are used to correct the summation procedures in the postcoding comb filters A26, B26 and C26 in variants of the FIG. 8 digital receiver apparatus.

The FIG. 8 digital receiver apparatus is modified in yet other variants to use additional parallel data-slicing operations, each carried out by a cascade connection of respective NTSC-rejection filter followed by a respective even-level data slicer followed by a respective postcoding comb filter. Each additional NTSC-rejection filter is provided an additional co-channel interference detector for determining whether co-channel interference from an analog TV signal is currently such that the NTSC-rejection filter will be effective in suppressing it. While two additional parallel data-slicing operations are shown in FIG. 8, modifications to use still further parallel data-slicing operations can provide capability for refining the best estimate of correct symbol decoding result still further.

The NTSC-rejection comb filter A20 and the postcoding comb filter A26 circuitry are advantageously chosen to be of types like the NTSC-rejection comb filter 520 and the postcoding comb filter 526 circuitry of FIG. 7. The high-energy demodulation artifacts generated in response to analog TV synchronizing pulses, equalizing pulses, and color bursts are all suppressed when the NTSC-rejection comb filter A20 differentially combines alternate video frames. Also, artifacts arising from the video content of the analog TV signal that does not change over two frames are suppressed, getting rid of stationary patterns irrespective of their spatial frequency or color.

The remaining problem of suppressing demodulation artifacts primarily concerns suppressing those demodulation artifacts arising from frame-to-frame difference at certain pixel locations within the analog TV signal raster. These demodulation artifacts can be suppressed by intra-frame filtering techniques. The NTSC-rejection comb filter B20 and the postcoding comb filter B26 circuitry can be chosen to suppress remnant demodulation artifacts by relying on correlation in the horizontal direction, and the NTSC-rejection comb filter C20 and the postcoding comb filter C26 circuitry can be chosen to suppress remnant demodulation artifacts by relying on correlation in the vertical direction. Consider how such a design decision can be further implemented.

Since the sound carrier of a co-channel interfering analog TV signal has been suppressed by SAW filter 4, the NTSC-rejection comb filter B20 and the postcoding comb filter B26 circuitry are advantageously chosen to be of types like the NTSC-rejection comb filter 220 and the postcoding comb filter 226 circuitry of FIG. 4.

The optimal choice of the NTSC-rejection comb filter C20 and the postcoding comb filter C26 circuitry is less straightforward, because of the choice one must make (in consideration of field interlace in the interfering analog TV signal) whether to choose the temporally closer scan line in the same field or the spatially closer line in the preceding field to be combined with the current scan line in the NTSC-rejection comb filter C20. Choosing the temporally closer scan line in the same field is generally the better choice, since jump cuts between fields are less likely to ravage NTSC rejection by the comb filter C20. With such choice, the NTSC-rejection comb filter C20 and the postcoding comb filter C26 circuitry are of types like the NTSC-rejection comb filter 320 and the postcoding comb filter 326 circuitry of FIG. 5. With the other choice instead, the NTSC-rejection comb filter C20 and the postcoding comb filter C26 circuitry are of types like the NTSC-rejection comb filter 420 and the postcoding comb filter 426 circuitry of FIG. 6.

The FIG. 8 digital receiver apparatus is modified in yet other variants to use additional parallel data-slicing operations. Additional parallel data-slicing operations allow the NTSC-rejection comb filter C20 and the postcoding comb filter C26 circuitry to be of types like the NTSC-rejection comb filter 320 and the postcoding comb filter 326 circuitry of FIG. 5, for example, while still allowing the use of a further NTSC-rejection comb filter and further postcoding comb filter circuitry of types like the NTSC-rejection comb filter 420 and the postcoding comb filter 426 circuitry of FIG. 6. Additional parallel data-slicing operations further allow NTSC-rejection comb filters and postcoding comb filters with differential delays of 681 symbol epochs and with delays of 687 symbol epochs to be used for suppressing analog TV signals with little chroma content.

Figure 9:
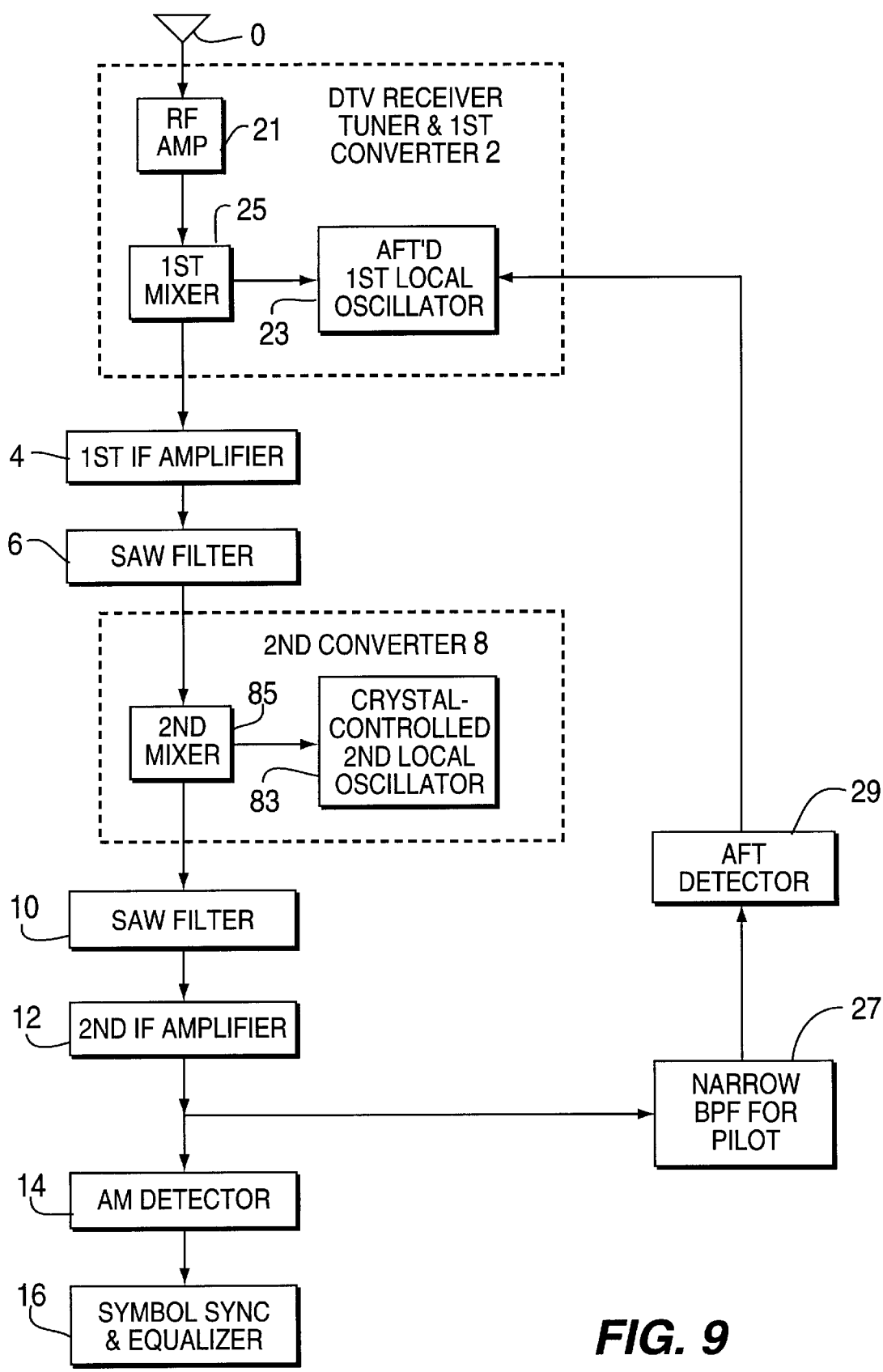
FIG. 9 is a block schematic diagram showing how automatic fine-tuning (AFT) is applied to the first detector in the digital television signal receivers of FIG. 1 and FIG. 8.

FIG. 9 is a block schematic diagram showing how automatic fine-tuning (AFT) is applied to the first detector of a digital television signal receiver of plural conversion type as used in FIG. 1 or 8, presuming that the SAW filter 6 is only 5.7 MHz wide. Practically considered, AFT is a necessity for assuring that the first intermediate frequency signal supplied by the first converter is aligned correctly with the sound trap in the SAW filter 6. The tuner and first converter circuitry 2 is shown in FIG. 9 to include a radio-frequency amplifier 21 and a first local oscillator 23, which per custom are provided with tracking adjustable tuning. The tuner and first converter circuitry 2 is shown in FIG. 9 also to include a first mixer 25 for multiplicatively mixing the response of the RF amplifier 21 and oscillations from the first local oscillator 23 to generate the first IF signal and its image. A broadband coupling network (not explicitly shown) couples the first IF signal, but not its image, to the first IF amplifier 4 as input signal thereto. The first local oscillator 23 is of a type that can be fine tuned in response to an electric fine-tuning control signal. A narrow bandpass filter 27 selects the pilot carrier component of the amplified second IF signal the second IF amplifier supplies to an automatic fine tuning detector 29, which supplies the electric fine-tuning control signal to the first local oscillator 23 for completing an AFT feedback control loop. The AFT detector 29 is similar to any AFT detector used in analog TV receivers except for being tuned for DTV pilot carrier frequency, rather than for video carrier frequency.

In order for the error signal developed by the AFT detector 29 in response to the VHF amplified second IF signal to adjust the UHF amplified first IF signal supplied to the SAW filter 6 properly, so that NTSC audio signals align properly with the sound trap in the SAW filter 6, the offset between the frequencies of the first and second IF signals must be constant. To achieve this desideratum, a crystal-controlled second local oscillator 83 is included in the second converter 8 to supply fixed-frequency oscillations to a second mixer 85 also included in the second converter 8. The mixer 85 multiplicatively mixes these fixed-frequency oscillations with the response of the SAW filter 6 to the amplified first IF signal in a heterodyning procedure that generates the second IF signal for application to the SAW filter 10, which second IF signal is offset in frequency from the amplified first IF signal by the fixed frequency of the oscillations supplied to the mixer 85 from the second local oscillator 83.

In the claims which follow, the word "said" is used whenever reference is made to an antecedent, and the word "the" is used for grammatical purposes other than to refer back to an antecedent.

What is claimed is:

1. A digital television signal receiver for receiving, a digital television signal composed of a stream of 2N-level symbols each having a symbol epoch of a specified length in time, which stream is susceptible to being accompanied by artifacts of co-channel interfering NTSC analog television signal having an amplitude-modulated video carrier and a frequency-modulated audio carrier said digital television signal receiver comprising:

tuner and conversion circuitry for generating an intermediate-frequency signal responsive to said digital television signal;

an amplitude detector responsive to said intermediate-frequency signal for reproducing said stream of 2N-level symbols:

a bandpass filter for determining the bandwidth of said intermediate-frequency signal so as to suppress the artifacts of said frequency-modulated audio carrier of said co-channel interfering NTSC analog television signal in said stream of 2N-level symbols as reproduced by said amplitude detector;

symbol synchronization and equalizer circuitry connected for receiving said stream of 2N-level symbols as reproduced by said amplitude detector and supplying an amplitude and phase equalized response to said stream;

circuitry for selectively comb filtering said equalized response to suppress artifacts of said amplitude-modulated video carrier; and symbol decoding circuitry including at least one data slicer responsive to said equalized response as selectively comb filtered.

2. The digital television signal receiver of claim 1, wherein said bandpass filter is a surface-acoustic-wave filter that has a trap for said artifacts of said frequency-modulated audio carrier as they appear in input signal thereto, that has essentially flat amplitude response to said digital television signal and that has essentially linear phase response to said digital television signal.

3. A digital television signal receiver for receiving a digital television, signal composed of a stream of 2N-level symbols each having a symbol epoch of a specified length in time, which stream is susceptible to being accompanied by artifacts of co-channel interfering NTSC analog television signal, said digital television signal receiver comprising:

a tuner for selecting one of channels at different locations in a frequency band, said tuner including;

first frequency-conversion circuitry for frequency-converting the selected channel to obtain a first frequency-conversion result signal including a first intermediate-frequency signal reposing within a first intermediate-frequency band located in a portion of the electromagnetic wave frequency spectrum above any ultra-high-frequency television broadcast channel, said first frequency-conversion circuitry including:

a first local oscillator supplying first local oscillations that are fine-tuned in response to an electric fine-tuning signal; and a first mixer for multiplicatively mixing said selected channel with said first local oscillations to generate said first frequency-conversion result signal;

a first intermediate-frequency amplifier for amplifying said first intermediate-frequency signal to supply an amplified first intermediate-frequency signal;

second frequency-conversion circuitry for frequency-converting said amplified first intermediate-frequency signal to obtain a second frequency-conversion result signal including a second intermediate-frequency signal reposing within a second intermediate-frequency band located in a portion of the electromagnetic wave frequency spectrum below any very-high-frequency television broadcast channel, said second frequency-conversion circuitry including:

a second local oscillator supplying second local oscillations of fixed frequency; and a second mixer for multiplicatively mixing said amplified first intermediate-frequency signal with bandwidth determined by said first acoustic wave filter with said second local oscillations to generate said second frequency-conversion result signal;

a second intermediate-frequency amplifier for amplifying said second intermediate-frequency signal to supply an amplified second intermediate-frequency signal;

an amplitude modulation detector responsive to amplitude modulation of said amplified second intermediate-frequency signal for detecting a baseband signal therefrom, which baseband signal comprises said 2N-level symbols;

a first data-slicer for data-slicing said baseband signal to generate interim symbol decoding results responsive to said 2N-level symbols;

a bandpass filter for separating a pilot carrier component of said amplified second intermediate-frequency signal;

an automatic fine tuning detector responsive to the separated said pilot carrier component of said amplified second intermediate-frequency signal for generating said electric fine-tuning signal applied to said first local oscillator for fine-tuning the frequency of said first local oscillations; and bandpass filtering for causing said amplified second intermediate-frequency signal to respond to portions of said second intermediate-frequency signal converted in frequency from digital television signal transmissions extending from the lower frequency limit of said selected channel to approximately 300 kHz below the upper frequency limit of said selected channel, and for suppressing any substantial response of said amplified second intermediate-frequency signal to portions of said second intermediate-frequency signal converted in frequency from digital television signal transmissions extending from approximately 300 kHz below the upper frequency limit of said selected channel to at least the upper frequency limit of said selected channel, thereby rejecting the frequency-modulated sound carrier of any co-channel interfering NTSC analog television signal to avoid its affecting said data-slicing of said baseband signal by said first data-slicer, said bandpass filtering including:

a first surface-acoustic-wave filter that precedes said second frequency-conversion circuitry and that determines the bandwidth of said bandpass filtering.

4. A digital television signal receiver for receiving a digital television signal composed of a stream of 2N-level symbols each having a symbol epoch of a specified length in time which stream is susceptible to being accompanied by artifacts of co-channel interfering NTSC analog television signal said digital television signal receivers comprising:

a tuner for selecting one of channels at different locations in a frequency band, said tuner including first frequency-conversion circuitry for frequency-converting the selected channel to obtain a first frequency-conversion result signal including a first intermediate-frequency signal reposing, within a first intermediate-frequency band located in a portion of the electromagnetic wave frequency spectrum above any ultra-high-frequency television broadcast channel, a first intermediate-frequency amplifier for amplifying said first intermediate-frequency signal to supply an amplified first intermediate-frequency signal;

second frequency-conversion circuitry for frequency-converting said amplified first intermediate-frequency signal to obtain a second frequency-conversion result signal including a second intermediate-frequency signal reposing within a second intermediate-frequency band located in a portion of the electromagnetic wave frequency spectime below any very-high-frequency television broadcast channel;

a second intermediate-frequency amplifier for amplifying said second intermediate-frequency signal to supply an amplified second intermediate-frequency signal;

an amplitude modulation detector responsive to amplitude modulation of said amplified second intermediate-frequency signal for detecting a baseband signal therefrom which baseband signal comprises said 2N-level symbols;

a first data-slicer for data-slicing said baseband signal to generate interim symbol decoding results responsive to said 2N-level symbols;

bandpass filtering for causing said amplified second intermediate-frequency signal to respond to portions of said second intermediate-frequency signal converted in frequency from digital television signal transmissions extending from the lower frequency limit of said selected channel to approximately 300 kHz below the upper frequency limit of said selected channel, and for suppressing any substantial response of said amplified second intermediate-frequency signal to portions of said second intermediate-frequency signal converted in frequency from digital television signal transmissions extending from approximately 300 kHz below the upper frequency limit of said selected channel to at least the upper frequency limit of said selected channel, thereby rejecting the frequency-modulated sound carrier of any co-channel interfering NTSC analog television signal to avoid its affecting said data-slicing of said baseband signal by said first data-slicer;

a first delay device for exhibiting a delay of a prescribed first number of said symbol epochs, connected to respond to said baseband signal as applied to said first data slicer as input signal therefor, thereby to generate a first delayed baseband signal;

a first linear combiner which linearly combines said first delayed baseband signal and said baseband signal as applied to said first data slicer as input signal therefor, which differentially delayed baseband signals are received as first and second respective input signals of said first linear combiner, to generate a first stream of (4N−1)-level symbols as an output signal of said first linear combiner, said first stream of (4N−1)-level symbols providing a first comb filter response in which said artifacts of any co-channel interfering analog television signal are suppressed;

a second linear combiner which linearly combines respective first and second input signals received thereby for supplying a respective output signal therefrom, one of said first and said second linear combiners being an adder and the other of said first and said second linear combiners being a subtractor;

a second data slicer decoding said first stream of (4N−1)-level symbols supplied as respective output signal from said first linear combiner, for generating first supplemental symbol decoding results applied to said second linear combiner as said respective first input signal thereof;

a two-input first multiplexer receiving said interim symbol decoding results as a first input signal thereto, receiving the output signal from said second linear combiner as a second input signal thereto, and reproducing as an output signal therefrom one of its said first and said second inputs signals as selected in response to a first multiplexer control signal, the output signal of said first multiplexer being used at least at times as final symbol decoding results; and a second delay device connected for delaying the output signal of said first multiplexer said prescribed first number of symbol epochs to generate said second input signal of said second linear combiner.

5. The digital television signal receiver of claim 4, further comprising:

symbol decoding selector circuitry for supplying final symbol decoding results, as selected from estimated symbol decoding results, said estimated symbol decoding results including said interim symbol decoding results and further including said output signal from said first multiplexer.

6. The combination of claim 4, wherein said first linear combiner is a subtractor and said second linear combiner is a modulo-2N adder.

7. The combination of claim 6, wherein said prescribed first number of symbol epochs is twelve.

8. The combination of claim 7, wherein said first multiplexer control signal conditions said first multiplexer to reproduce, as the output signal therefrom, said interim symbol decoding results for the first twelve symbol epochs of each data segment following the data segment synchronizing sequence.

9. The combination of claim 4, wherein said first linear combiner is an adder and said second linear combiner is a modulo-2N subtractor.

10. The combination of claim 9, wherein said prescribed first number of symbol epochs is six.

11. The combination of claim 1, wherein said prescribed first number of symbol epochs is substantially equal to the number of symbol epochs in two horizontal scan lines of said co-channel interfering analog television signal.

12. The combination of claim 1, wherein said prescribed first number of symbol epochs is one-thousand three hundred sixty-eight.

13. The combination of claim 1, wherein said prescribed first number of symbol epochs is substantially equal to the number of symbol epochs in two hundred sixty-two horizontal scan lines of said co-channel interfering analog television signal.

14. The combination of claim 1, wherein said prescribed first number of symbol epochs is one hundred seventy-nine thousand two hundred eight.

15. The combination of claim 1, wherein said prescribed first number of symbol epochs is substantially equal to the number of symbol epochs in two video frames of said co-channel interfering analog television signal.

16. The combination of claim 1, wherein said prescribed first number of symbol epochs is seven hundred eighteen thousand two hundred.

17. The combination of claim 4, further comprising:

an NTSC detector connected for generating an indication of when said stream of 2N-level symbols supplied from said digital television signal detection apparatus is accompanied by artifacts of co-channel interfering analog television signal that can be suppressed in said first comb filter response and that are of a significant energy level strong enough to interfere with said first data slicer decoding said stream of 2N-level symbols, said indication being supplied to said symbol decoding selector circuitry, said symbol decoding selector circuitry selecting said interim symbol decoding results as said final symbol decoding results only if said NTSC detector does not generate a current indication that said stream of 2N-level symbols supplied from said digital television signal detection apparatus is accompanied by said artifacts of co-channel interfering analog television signal that can be suppressed in said first comb filter response and that are of said significant energy level.

18. The combination of claim 4, further comprising:

a third delay device for exhibiting a delay of a prescribed second number of said symbol epochs, connected to respond to said baseband signal as applied to said first data slicer as input signal therefor, thereby to generate a second delayed baseband signal;

a third linear combiner which linearly combines said second delayed baseband signal and said baseband signal as applied to said first data slicer as input signal therefor, which differentially delayed baseband signals are received as first and second respective input signals of said first linear combiner, to generate a second stream of (4N−1)-level symbols as an output signal of said third linear combiner, said second stream of (4N−1)-level symbols providing a second comb filter response in which said artifacts of any co-channel interfering analog television signal are suppressed;

a fourth linear combiner which linearly combines respective first and second input signals received thereby for supplying a respective output signal therefrom, one of said third and said fourth linear combiners being an adder and the other of said first and said second linear combiners being a subtractor;

a third data slicer decoding said second stream of (4N−1)-level symbols supplied as respective output signal from said third linear combiner, for generating second supplemental symbol decoding results applied to said fourth linear combiner as said respective first input signal thereof;

a two-input second multiplexer receiving said interim symbol decoding results as a first input signal thereto, receiving the output signal from said fourth linear combiner as a second input signal thereto, and reproducing as an output signal therefrom one of its said first and said second input signals as selected in response to a second multiplexer control signal, said output signal of said second multiplexer being supplied to said symbol decoding selector as a further one of said estimated symbol decoding results; and a fourth delay device connected for delaying the output signal of said second multiplexer by said prescribed second number of symbol epochs to generate said second input signal of said fourth linear combiner.

19. The digital television signal receiver of claim 1, wherein said bandpass filter provides for the bandwidth of said intermediate-frequency signal to which said amplitude detector responds to be at least 5.38 megahertz.

* * * * *